United States Patent
Handa et al.

(10) Patent No.: US 8,880,590 B2
(45) Date of Patent: Nov. 4, 2014

(54) INFORMATION PROCESSING APPARATUS AND EXECUTION CONTROL METHOD

(75) Inventors: Yuji Handa, Tokyo (JP); Seiichi Aoyagi, Tokyo (JP); Ken Onogi, Tokyo (JP)

(73) Assignee: Sony Corporation, Tokyo (JP)

( * ) Notice: Subject to any disclaimer, the term of this patent is extended or adjusted under 35 U.S.C. 154(b) by 298 days.

(21) Appl. No.: 12/990,949

(22) PCT Filed: Feb. 3, 2010

(86) PCT No.: PCT/JP2010/051484
§ 371 (c)(1),
(2), (4) Date: Nov. 4, 2010

(87) PCT Pub. No.: WO2010/116780
PCT Pub. Date: Oct. 14, 2010

(65) Prior Publication Data
US 2011/0066680 A1  Mar. 17, 2011

(30) Foreign Application Priority Data
Apr. 7, 2009  (JP) ................................. 2009-093411

(51) Int. Cl.
*G06F 15/16* (2006.01)
*G06F 21/51* (2013.01)

(52) U.S. Cl.
CPC ........ *G06F 21/51* (2013.01); *G06F 2221/2115* (2013.01)
USPC ........................................................ 709/203

(58) Field of Classification Search
USPC .......................................... 709/203; 726/21
See application file for complete search history.

(56) References Cited

U.S. PATENT DOCUMENTS

| 6,092,194 A | * | 7/2000 | Touboul .......................... 726/24 |
| 7,099,663 B2 | * | 8/2006 | Lundblade et al. ........... 455/425 |

(Continued)

FOREIGN PATENT DOCUMENTS

| JP | 2001 117763 | 4/2001 |
| JP | 2002 514326 | 5/2002 |
| JP | 2008 46959 | 2/2006 |
| JP | 2006 92382 | 4/2006 |

OTHER PUBLICATIONS

International Search Report issued Mar. 2, 2010 in PCT/JP10/051484 filed Feb. 3, 2010.

*Primary Examiner* — Hanh N Nguyen
*Assistant Examiner* — Jose Perez
(74) *Attorney, Agent, or Firm* — Oblon, Spivak, McClelland, Maier & Neustadt, L.L.P.

(57) ABSTRACT

Provided an information processing apparatus including a communication unit, an acquisition unit that acquires an application from an external storage apparatus each time processing concerning execution is started, a determination unit that determines whether the external storage apparatus acting as an acquisition source is registered, a first determination unit that determines whether to execute the application based on a user's operation if it is determined that the external storage apparatus is not registered, a communication processing unit that performs communication with an authentication server if the first determination unit determines to execute the application, a second determination unit that determines whether to execute the application based on an authentication result transmitted from the authentication server, and an execution processing unit that selectively executes the acquired application if the determination unit determines that the external storage apparatus is registered or the second determination unit determines to execute the application.

10 Claims, 13 Drawing Sheets

(56) References Cited

U.S. PATENT DOCUMENTS

| | | |
|---|---|---|
| 7,401,357 B2* | 7/2008 | Hasegawa et al. ............... 726/21 |
| 2002/0144257 A1* | 10/2002 | Matsushima ................. 717/178 |
| 2005/0193101 A1* | 9/2005 | Oliver et al. .................. 709/220 |
| 2005/0201620 A1* | 9/2005 | Kanamoto et al. ............ 382/182 |
| 2006/0130144 A1* | 6/2006 | Wernicke ........................ 726/24 |
| 2006/0185015 A1* | 8/2006 | Cheston et al. ................. 726/24 |
| 2008/0189775 A1* | 8/2008 | Fujita ............................... 726/7 |

\* cited by examiner

FIG. 9

| METHOD: | /widet/status/ | |
|---|---|---|
| REQUEST: | -HTTP METHOD | GET |
| | -PARAMETERS | URI OF WIDGET |

EXAMPLE:
GET http://api.o×△.com/widget/status/http://widget.△o□×.com/WidgetA/

FIG. 10

| FORMAT: | XML | |
|---|---|---|
| | -response ELEMENT | err ATTRIBUTE: 0 = SUCCESSFUL RESPONSE, OTHERWISE = RESPONSE FAILURE |
| | -widget ELEMENT | id ATTRIBUTE: URI OF WIDGET<br>status ATTRIBUTE: 0 = EXECUTION PERMITTED, WISE = EXECUTION REJECTED |

EXAMPLE:
```
<?xml version="1.0" encoding="utf8" ?>
<response err="0">
   <widget id="http://api.△o□×.com/widgetA/" status="0" />
</response>
```

FIG. 13

| METHOD: | /widet/report/ | |
|---|---|---|
| REQUEST: | -HTTP METHOD | POST |
| | -PARAMETERS | URI OF WIDGET, VALUE CORRESPONDING TO REPORT CONTENT |

EXAMPLE:
POST http://api.○×△.com/widget/report/http://widget.△○□×.com/WidgetA/ report=2

FIG. 14

| FORMAT: | XML | |
|---|---|---|
| | -response ELEMENT | err ATTRIBUTE: 0 = SUCCESSFUL RESPONSE, OTHERWISE = RESPONSE FAILURE |
| | -widget ELEMENT | id ATTRIBUTE: URI OF WIDGET report ATTRIBUTE: VALUE TRANSMITTED FROM INFORMATION PROCESSING APPARATUS |

EXAMPLE:
```
<?xml version="1.0" encoding="utf8" ?>
<response err="0">
    <widget id="http://host.□×○.com/widgetA/" report="2" />
</response>
```

INFORMATION PROCESSING APPARATUS AND EXECUTION CONTROL METHOD

TECHNICAL FIELD

The present invention relates to an information processing apparatus and an execution control method.

BACKGROUND ART

An information processing apparatus such as a PC (Personal Computer) and mobile phone can execute application software other than application software embedded during manufacture by, for example, the application software being installed.

In the meantime, technology concerning control of application software execution has been developed. Technology to control execution of application software installation based on an authentication result in an external apparatus include, for example, Patent Document 1.

Citation List

Patent Literature

Patent Literature 1: Japanese Patent Application Laid-Open No. 2006-92382

SUMMARY OF INVENTION

Technical Problem

In recent years, with increasingly faster communication and widespread use of networks such as the Internet, it has become possible for an information processing apparatus to acquire application software (hereinafter, may also be called an "application") from an external apparatus via a network to execute the application software. With the operation described above, the information processing apparatus can, for example, execute an application other than applications stored in the external apparatus and embedded during manufacture, so that multi-functionality of the information processing apparatus can easily be realized.

When the information processing apparatus acquires an application, for example, from an external apparatus via a network, safety when the acquired application is executed needs to be enhanced. Safety when an application is executed indicates, for example, that no problem arises when the application is executed and safety is enhanced by further reducing the possibility that a problem arises. Problems that could arise when an application is executed include, for example, an occurrence of some malfunction in the information processing apparatus by an application being executed, unauthorized access by a malicious third party being carried out, and leakage of personal information.

Thus, when an application is delivered via a network, for example, an application for which no occurrence of problem when executed has been verified in advance by the manufacturer of the information processing apparatus or an organization authorized by the manufacturer is delivered. However, applications that can be acquired by the information processing apparatus from an external apparatus via a network are not limited to applications whose safety has been verified in advance, for example, applications released by individuals.

When an application for which no occurrence of problem has not been verified in advance is acquired, for example, the information processing apparatus notifies the user that safety thereof has not been verified, and the application is executed based on a user's operation. In the above case, however, if the notified user does not know whether safety of an application is ensured before a user's operation to permit execution thereof being performed, there is the possibility that a problem concerning safety arises after execution of the application being permitted. Moreover, even if the user knows that safety of an application is ensured when the user permits execution thereof, a problem concerning safety may arise after execution of the application being permitted if a problem concerning safety exists unidentified when execution of the application is permitted.

An information processing apparatus to which conventional technology concerning control of application software execution (hereinafter, called a "conventional information processing apparatus") is applied detects the start of installation of an application. The conventional information processing apparatus also checks with an external server to see whether installation of the application is permitted for the information processing apparatus and if permitted, installs the application. Then, the conventional information processing apparatus suitably executes the installed application based on a user's operation or automatically. That is, according to conventional technology, execution of an application is controlled by an external server during installation of the application. Thus, by using conventional technology, installation of an application whose problem with safety has been identified is prevented and thus, a conventional information processing apparatus may be able to improve safety concerning execution of an application to some extent.

However, according to conventional technology, execution of an application is controlled only during installation of the application. Thus, for example, if some problem concerning safety of an application is detected after installation of the application is permitted, a conventional information processing apparatus will optionally execute the application having a problem concerning safety.

Moreover, applications acquired by an information processing apparatus from an external apparatus via a network are not limited to those applications that are installed after the acquisition and executed after the installation. For example, the information processing apparatus can execute, like an application called a widget, an application that is appropriately acquired from an external apparatus for execution each time execution is started by acquiring the application from the external apparatus.

However, conventional technology only controls execution of an application during installation of the application and thus, it is difficult for the conventional technology to control execution of an application, like a widget, that is executed without being installed.

Therefore, even if the conventional technology is used, there is no way to improve safety concerning execution of an application.

The present invention is made in view of the above-mentioned issue, and aims to provide a novel and improved information processing apparatus capable of improving safety in execution of application software acquired from an external apparatus for execution each time execution of the application software is started and an execution control method.

Solution to Problem

According to the first aspect of the present invention in order to achieve the above-mentioned object, there is provided an information processing apparatus, including: a communication unit capable of communicating with an external apparatus; an acquisition unit that acquires application software from an external storage apparatus storing the application software via the communication unit each time processing concerning execution of the application software is started; a registration determination unit that determines whether the external storage apparatus, which is an acquisition source of the acquired application software, is a pre-registered external storage apparatus; a first execution determination unit that determines whether to execute the acquired application software based on a user's operation if the registration determination unit determines that the external storage apparatus acting as the acquisition source is not registered; a communication processing unit that performs communication concerning authentication to execute the application software with an authentication server via the communication unit if the first execution determination unit determines to execute the application software; a second execution determination unit that determines whether to execute the application software based on an authentication result transmitted from the authentication server; and an execution processing unit that selectively executes the acquired application software if the registration determination unit determines that the external storage apparatus is registered or the second execution determination unit determines to execute the application software.

According to such configuration, safety in execution of application software acquired from an external apparatus for execution each time execution of the application software is started can be improved.

Further, if the registration determination unit determines that the external storage apparatus acting as the acquisition source is not registered, the registration determination unit determines whether the acquired application software is registered application software and if the registration determination unit determines that the application software is registered, the first execution determination unit does not determine whether to execute the application software, and the communication processing unit may perform communication concerning the authentication with the authentication server.

Further, the information processing apparatus may further include a storage unit that stores registered external storage apparatus information in which information to identify the external storage apparatus is stored, and the registration determination unit may determine whether the external storage apparatus acting as the acquisition source is registered based on the registered external storage apparatus information and the information to identify the external storage apparatus acting as the acquisition source contained in the acquired application software.

Further, the communication processing unit may perform communication with the external storage apparatus recorded in the registered external storage apparatus information via the communication unit based on the registered external storage apparatus information stored in the storage unit and perform communication with the authentication server based on authentication server information in which information to identify the authentication server acquired from the external storage apparatus recorded in the registered external storage apparatus information is recorded.

Further, if the authentication server information is stored in the storage unit, the communication processing unit may perform communication with the authentication server based on the authentication server information stored in the storage unit.

Further, the information processing apparatus may further include a storage unit that stores registered application information indicating registered application software, and the registration determination unit may determine whether the acquired application software is registered based on the registered application information stored in the storage unit.

Further, if neither the first execution determination unit nor the second execution determination unit determines to execute the application software, the execution processing unit may not execute the acquired application software.

Further, the information processing apparatus may further include a report information transmission processing unit that performs processing to cause transmission of report information indicating a problem concerning safety of the executed application software to the authentication server.

According to the second aspect of the present invention in order to achieve the above-mentioned object, there is provided an execution control method, including the steps of: acquiring application software from an external storage apparatus storing the application software each time processing concerning execution of the application software is started; determining whether the external storage apparatus, which is an acquisition source of the acquired application software acquired in the acquisition step, is a pre-registered external storage apparatus; determining whether to execute the acquired application software based on a user's operation if it is determined in the registration determination step that the external storage apparatus acting as the acquisition source is not registered; performing communication concerning authentication to execute the application software with an authentication server if the determination to execute the application software is made in the first execution determination step; determining whether to execute the application software based on an authentication result transmitted from the authentication server; and executing the acquired application software selectively if the determination is made in the registration determination step that the external storage apparatus is registered or the determination to execute the application software is made in the second execution determination step.

By using the above method, safety in execution of application software acquired from an external apparatus for execution each time execution of the application software is started can be improved.

Advantageous Effects of Invention

According to the present invention, safety in execution of application software acquired from an external apparatus for execution each time execution of the application software is started can be improved.

BRIEF DESCRIPTION OF DRAWINGS

FIG. 9 is an explanatory view exemplifying a safety information transmission request transmitted by the information processing apparatus according to an embodiment of the present invention.

FIG. 10 is an explanatory view exemplifying safety information transmitted by an authentication server according to an embodiment of the present invention.

FIG. 13 is an explanatory view exemplifying the report information transmitted by the information processing apparatus according to an embodiment of the present invention.

FIG. 14 is an explanatory view exemplifying a reception result transmitted by the authentication server according to an embodiment of the present invention.

REFERENCE SIGNS LIST

Figure 1:
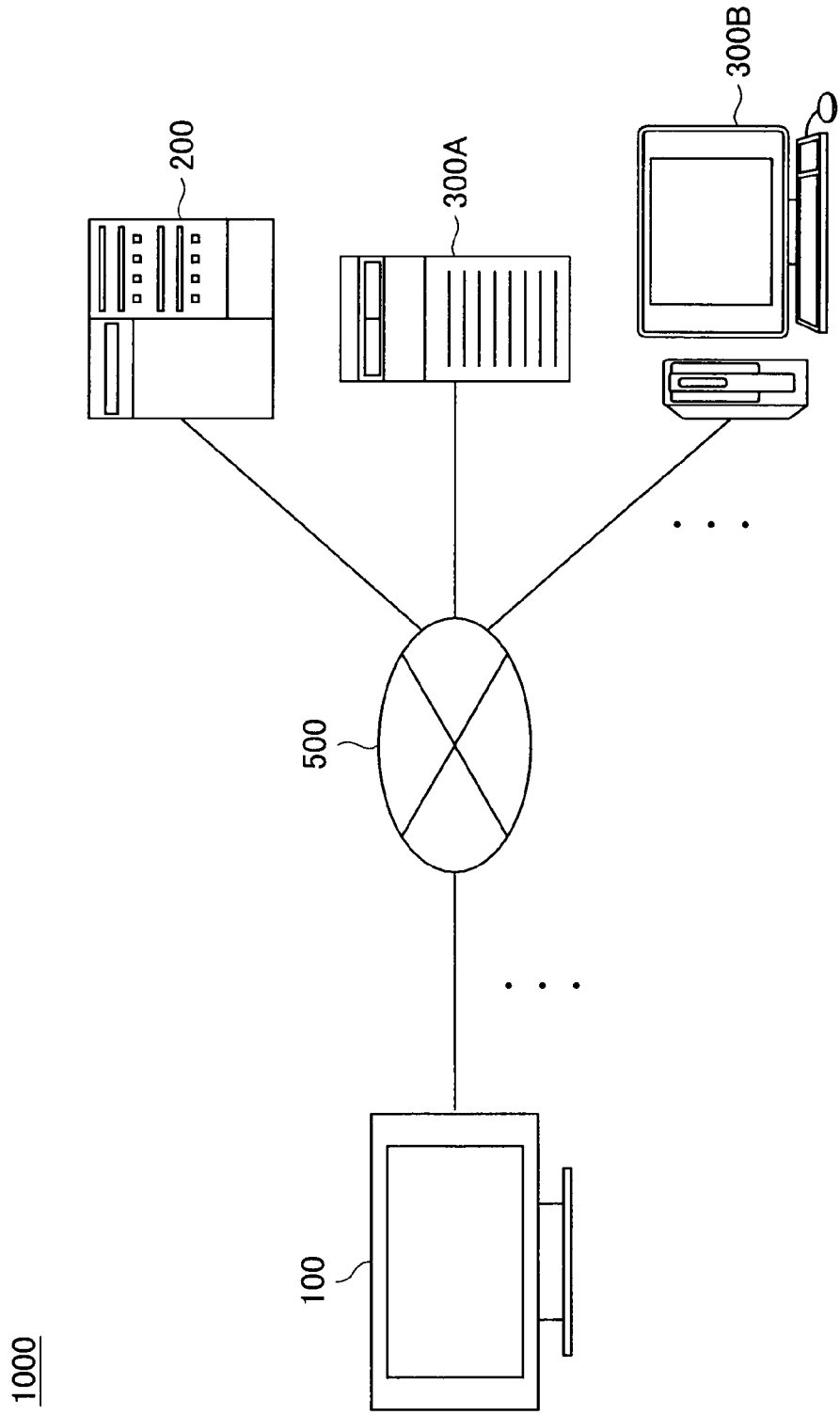
FIG. 1 is an explanatory view exemplifying an information processing system according to an embodiment of the present invention.

100 Information processing apparatus
102 Communication unit
104 Storage unit
106 Control unit
120 Acquisition unit
122 Registration determination unit
124 First execution determination unit
126 Communication processing unit
128 Second execution determination unit
130 Execution processing unit
132 Report information transmission processing unit
200 Authentication server
300, 300A, 300B External server
1000 Information processing system

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

A description will be made below in the order shown below:

1. Approach According to an Embodiment of the Present Invention
2. Information Processing Apparatus According to an Embodiment of the Present Invention
3. Program According to an Embodiment of the Present Invention (Approach According to an Embodiment of the Present Invention)

Before the configuration of an information processing apparatus according to an embodiment of the present invention is described, a safety improvement approach according to an embodiment of the present invention will be described.

[Overview of an Information Processing System According to an Embodiment of the Present Invention]

FIG. 1 is an explanatory view exemplifying an information processing system 1000 according to an embodiment of the present invention. Referring to FIG. 1, the information processing system 1000 has an information processing apparatus 100, an authentication server 200, and external servers 300A, 300B, . . . (external storage apparatuses and hereinafter may be collectively called an "external server 300") and each apparatus is connected via a network 500 (or directly).

The network 500 includes, for example, a wire network such as a LAN (Local Area Network) and WAN (Wide Area Network), a wireless network such as a wireless WAN (WWAN; Wireless Wide Area Network) via a base station and wireless MAN (WMAN; Wireless Metropolitan Area Network), and the Internet using a communication protocol such as TCP/IP (Transmission Control Protocol/Internet Protocol).

"Connection" according to an embodiment of the present invention refers to, for example, being in a state in which communication can be performed between apparatuses (or a state in which communication can be performed between apparatuses). That is, for example, it becomes possible for the information processing apparatus 100 to acquire (for example, download) an application stored in the external server 300A after the information processing apparatus 100 and the external server 300A being connected. Further, for example, the information processing apparatus 100 can perform communication concerning authentication to execute an application (described later) with the authentication server 200 after the information processing apparatus 100 and authentication server 200 being connected.

Though not shown in FIG. 1, the information processing system 1000 according to an embodiment of the present invention may has a plurality of information processing apparatuses 100 and/or a plurality of authentication servers 200. A display apparatus is shown as the information processing apparatus 100 in FIG. 1, but the information processing apparatus 100 is not limited to the display apparatus shown in FIG. 1. That is, FIG. 1 is a diagram exemplifying the information processing system 1000 according to an embodiment of the present invention, and an application example and appearance of the information processing apparatus 100 according to an embodiment of the present invention are not limited to those of FIG. 1. Similarly, application examples and appearances of the authentication server 200 and the external servers 300A and 300B are not limited to those of FIG. 1.

[Information Processing Apparatus 100]

The information processing apparatus 100 acquires an application stored in an external apparatus such as the external servers 300A, 300B, . . . each time the information processing apparatus 100 executes the application. Then, the information processing apparatus 100 selectively executes the application acquired from the external apparatus by performing processing concerning a safety improvement approach according to an embodiment of the present invention described later. More specifically, the information processing apparatus 100 performs, for example, processing as described below.

<Overview of Processing by the Information Processing Apparatus 100>

- Acquire an application from an external apparatus such as the external servers 300A, 300B, . . .
- Execute the acquired application selectively (processing concerning a safety improvement approach)
- Acquire data on service from the external apparatus if necessary
- Discard the application after execution thereof being completed

[Authentication Server 200]

The authentication server 200 performs communication concerning authentication to execute an application with the information processing apparatus 100. Communication concerning authentication to execute an application according to an embodiment of the present invention is a sequence of communication (and communication processing) in which the information processing apparatus 100 transmits a safety information transmission request, and the authentication server 200 transmits safety information to the information processing apparatus 100. Safety information is, for example, information about whether execution of an application is permitted by the authentication server 200 and corresponds to an authentication result of the authentication server 200.

The authentication server 200 also stores a database in which information about safety of applications is recorded in a server-side storage unit (not shown). In the authentication server 200, the database is used as a black list in which applications whose problem with safety is identified are registered (or as a white list in which applications whose safety is verified are registered). By using the database, the authentication server 200 can determine whether an application to be authenticated is a safe application in communication concerning authentication to execute the application (described later).

The authentication server 200 generates safety information of content in accordance with a result of the determination based on reception of a safety information transmission request and transmits the generated safety information to the information processing apparatus 100. That is, safety information (authentication result) can be considered to indicate whether a problem arises when an application is executed.

Information of applications whose problem with safety has been identified (or information of applications whose safety has been verified) is recorded in the database in advance, but information recorded in the database is not limited to the above example. For example, information of a new application can be added to the database or information of a recorded application can be updated or deleted.

The information of the application includes, for example, an ID that uniquely identifies the application and registered external storage apparatus information in which information to identify an external server (external storage apparatus) storing the application is recorded. The registered external storage apparatus information includes, for example, a URL (Uniform Resource Identifier) and IP (Internet Protocol) address. An example in which the information processing apparatus 100 or the authentication server 200 constituting the information processing system 1000 uniquely identifies the external server (external storage apparatus) storing an application by using the URI as the registered external storage apparatus information will mainly be described below.

An addition, update, or deletion operation on information in the database is performed based on, for example, an operation of an administrator of the authentication server 200, but an addition, update, or deletion operation on information in the database is not necessarily performed based on an operation of the administrator. For example, the authentication server 200 may receive report information (described later) transmitted by each of the information processing apparatuses 100 (not shown in FIG. 1) constituting the information processing system 1000 to perform an addition, update, or deletion operation on information in the database based on the received report information. The authentication server 200 realizes addition of information to the database by, for example, recording an application for which a predetermined number of pieces of report information that the application has a safety problem have been collected as an application having a safety problem in the database. Moreover, the authentication server 200 can similarly perform an update or deletion operation on information in the database based on, for example, collected report information.

The authentication server 200 may adopt the same hardware configuration (described later) as that of the information processing apparatus 100.

[External Server 300 (External Storage Apparatus)]

The external server 300 stores applications executable by the information processing apparatus 100. Then, the external server 300 transmits a stored application to the information processing apparatus 100 in response to an acquisition request from each of the information processing apparatuses 100 constituting the information processing system 1000.

The external server 300 constituting the information processing system 1000 is not limited to, for example, storage of applications whose safety has been verified by the manufacturer of the information processing apparatuses 100 or an organization accredited by the manufacturer. For example, the external server 300 may also store applications whose safety has not been verified by the manufacturer of the information processing apparatuses 100 or the like such as an application created by an individual.

An case in which the external server 300A shown in FIG. 1 is an external server storing applications whose safety has been verified by the manufacture or the like, and the external server 300B is an external server storing applications whose safety has not been verified by the manufacture or the like is taken as an example for the description below.

The external servers 300A, 300B, . . . may adopt the same hardware configuration (described later) as that of the information processing apparatus 100.

The information processing system 1000 has, for example, as shown in FIG. 1, the information processing apparatus 100, the authentication server 200, and the external apparatus 300. It is needless to say that the configuration of the information processing system 1000 according to an embodiment of the present invention is not limited to that shown in FIG. 1.

[Overview of the Safety Improvement Approach According to an Embodiment of the Present Invention]

Next, processing concerning the safety improvement approach in the information processing apparatus 100 according to an embodiment of the present invention will be described.

The information processing apparatus 100 acquires an application from the external server 300 appropriately each time the information processing apparatus 100 starts execution (processing for execution) of the application stored in the external server 300. When an application is acquired, the information processing apparatus 100 performs registration determination processing based on an acquisition source of the application, first execution determination processing based on a user's operation, and second execution determination processing based on a communication result with the authentication server 200. Then, if a determination result that safety of the application has been verified is obtained, the information processing apparatus 100 selectively executes the acquired application.

Thus, the information processing apparatus 100 can improve safety in execution of application software acquired from an external apparatus for execution each time execution of the application software is started. If, for example, the acquired application is a pre-registered application, the information processing apparatus 100 may selectively execute the acquired application without performing the first execution determination processing.

More specifically, the information processing apparatus 100 improves safety in execution of application software executed by being acquired from an external apparatus by, for example, performing processing of (1) to processing of (5) shown below. The information processing apparatus 100 further performs processing of (6) to further improve safety by selectively transmitting report information (described later) to the authentication server 200.

(1) Acquisition Processing of an Application

The information processing apparatus 100 acquires (for example, downloads) an application whose execution is desired and stored in the external server 300 each time execution of the application is started. The information processing apparatus 100 acquires an application by transmitting a corresponding acquisition request of the application to the external server 300 based on a user's operation in a browser or a predetermined application acquisition screen, but the acquisition method of an application is not limited to the above method.

A user of the information processing apparatus 100 performs a user's desired operation by, for example, using an operation unit (described later) provided with the information processing apparatus 100, but the target on which the user performs the user's operation is not limited to the above example. For example, the user may operate an external operation apparatus such as a remote controller so that the information processing apparatus 100 can perform processing based on a user's operation based on an external operation signal corresponding to the received user's operation on the external operation apparatus transmitted from the external operation apparatus.

(2) Registration Determination Processing

After the application to be executed being acquired by the processing of (1), the information processing apparatus 100 determines whether the external server 300, which is an acquisition source of the application, is a pre-registered external server (external storage apparatus).

More specifically, the information processing apparatus 100 stores, for example, registered external storage apparatus information in which information to identify an external server (external storage apparatus) such as a URI is recorded in a storage unit (described later) provided with the information processing apparatus 100. The registered external storage apparatus information is recorded in the storage unit (described later) in advance, for example, during manufacture or shipment from a factory. Then, the information processing apparatus 100 determines whether the external server 300 acting as the acquisition source is registered based on the registered external storage apparatus information and information to identify the external server (external storage apparatus) acting as the acquisition source contained in the acquired application.

Registered external storage apparatus information according to an embodiment of the present invention is not limited to being stored in the storage unit (described later) provided with the information processing apparatus 100. For example, registered external storage apparatus information may be stored in a predetermined storage location such as a removable external recording medium or the storage unit (described later) of an external apparatus connected via a network (or directly). In the above case, the information processing apparatus 100 can determine whether the external server acting as the acquisition source is registered by acquiring the registered external storage apparatus information (for example, by downloading or reading the registered external storage apparatus information) appropriately from the predetermined storage location.

[When Determined that the External Server 300 is Registered]

A determination result when the above determination turns out that the external server 300 is registered indicates that the acquired application is an application that is acquired from the external server 300 storing applications whose safety has been verified and thus has no safety problem. Therefore, if the above determination result is obtained in the registration determination processing, the information processing apparatus 100 executes the application acquired in processing (execution processing) of (4) described later.

As described above, the information processing apparatus 100 acquires an application from the external server 300 for execution appropriately each time execution thereof is started. Even if some malfunction should be detected in an application stored in the external server 300 recorded in registered external storage apparatus information, the application is corrected appropriately or updated, for example, replaced by the external server 300. That is, when the information processing apparatus 100 acquires an application from the external server 300 recorded in registered external storage apparatus information, the information processing apparatus 100 can execute the application appropriately updated. Thus, the information processing apparatus 100 can improve safety in execution of an application by executing the application based on a determination result indicating that the determination result has been acquired from the external server 300 recorded in the registered external storage apparatus information.

[When Determined that the External Server 300 is not Registered]

A determination result when the above determination turns out that the external server 300 is not registered indicates that the acquired application is not an application acquired from the external server 300 storing applications whose safety has been verified. Then, when the above determination result is obtained, the information processing apparatus 100 performs processing (first execution determination processing) of (3) described later.

Processing of the information processing apparatus 100 when a determination result when the above determination turns out that the external server 300 is not registered is obtained is not limited to the above example. When the above determination result is obtained, the information processing apparatus 100 may, for example, determine whether the acquired application is registered to selectively perform the processing (first execution determination processing) of (3) described later in accordance with the determination result.

More specifically, for example, the information processing apparatus 100 stores registered application information indicating applications registered in the storage unit (described later). The registered application information includes, for example, an ID (for example, a program ID or the like) to identify an application. The information processing apparatus 100 registers (generates/updates) an application in the registered application information based on, for example, a user's operation. The information processing apparatus 100 selects an application whose execution has been performed as a registration target application in the registered application information based on history information indicating that the application has been performed stored, for example, in the storage unit (described later), but the registration method in the registered application information is not limited to the above method.

If the acquired application is an application registered in the registered application information, the information processing apparatus 100 determines that the acquired application is registered. Then, if the acquired application is not determined to be registered, the information processing apparatus 100 performs the processing (first execution determination processing) of (3) described later. If the acquired application is determined to be registered, the information processing apparatus 100 performs processing (second execution determination processing) of (4) described later.

As described above, the information processing apparatus 100 can selectively perform the processing (first execution determination processing) of (3) described later according to a determination based on the registered application information. Even in the above case, the information processing apparatus 100 does not execute the acquired application if safety thereof is not verified by the processing (second execution determination processing) of (4) described later. Thus, even if the processing (first execution determination processing) of (3) described later is selectively performed, the information processing apparatus 100 can improve safety in execution of an application.

Registered application information according to an embodiment of the present invention is not necessarily stored in the storage unit (described later) provided with the information processing apparatus 100. For example, the registered application information may be stored in a predetermined storage location such as a removable external recording medium or a storage unit (not shown) of an external apparatus connected via a network 500 (or directly). In the above case, the information processing apparatus 100 can determine whether the acquired application is registered by acquiring registered application information (for example, downloading or reading registered application information) from the predetermined storage location appropriately.

(3) First Execution Determination Processing

If, for example, the external server 300 acting as the acquisition source is not determined to be registered in the processing of (1), the information processing apparatus 100 performs the first execution determination processing to determine whether to execute the acquired application based on a user's operation.

Figure 2:
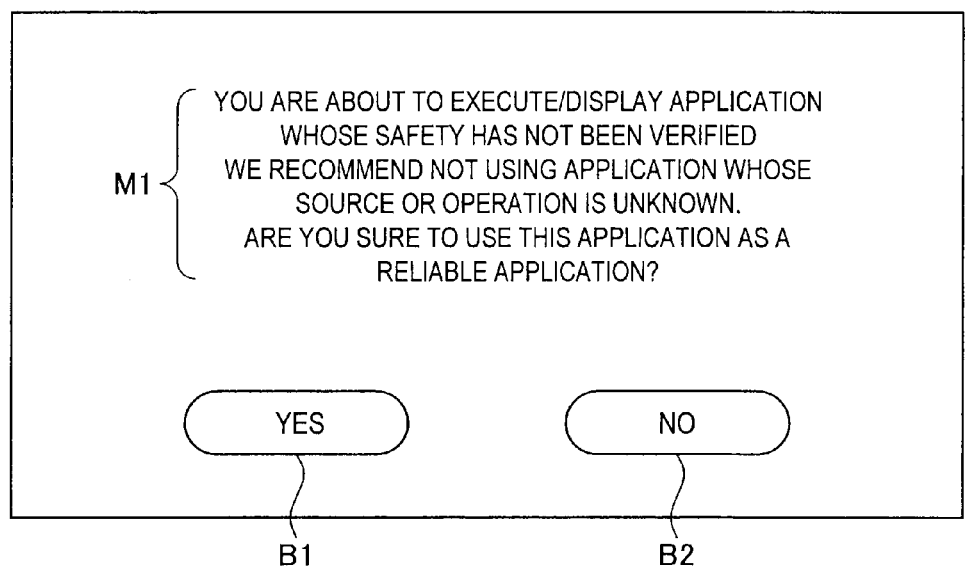
FIG. 2 is an explanatory view illustrating an example of first execution determination processing in an information processing apparatus according to an embodiment of the present invention.

FIG. 2 is an explanatory view illustrating an example of the first execution determination processing in the information processing apparatus 100 according to an embodiment of the present invention. FIG. 2 shows an example of a display screen (execution confirmation screen) for user's operation concerning execution of an application to be presented to the user by the information processing apparatus 100 for the first execution determination processing.

As shown in FIG. 2, the information processing apparatus 100 displays an image in which a message M1 and buttons B1 and B2 causing the user to make a selection are displayed on a display screen. It is needless to say that the execution confirmation screen displayed by the information processing apparatus 100 for the first execution determination processing according to an embodiment of the present invention is not limited to the example in FIG. 2.

The information processing apparatus 100 performs the first execution determination processing based on, for example, a user's operation (a pressing operation of a button B1 or a button B2) on an execution confirmation screen as shown, for example, in FIG. 2. More specifically, if the user selects, for example, the button B1 shown in FIG. 2, the information processing apparatus 100 determines that execution of the acquired application is permitted and performs the processing (second execution determination processing) of (4) described later. If the user selects, for example, the button B2 shown in FIG. 2, the information processing apparatus 100 determines that execution of the acquired application is not permitted and does not execute an application acquired in processing (execution processing) of (5) described later.

As described above, even if the user selects, for example, the button B2 shown in FIG. 2, the information processing apparatus 100 does not execute the acquired application if safety is not verified by the processing (second execution determination processing) of (4) described later. Thus, even if the user of the information processing apparatus 100 should not know that safety of the acquired application is verified, the information processing apparatus 100 can improve safety in execution of the application.

(4) Second Execution Determination Processing

If it is determined that execution is permitted in the processing (first execution determination processing) of (3), the information processing apparatus 100 performs, for example, processing of (4-1) and processing of (4-2) below.

(4-1) Communication Processing Concerning Authentication to Execute an Application The information processing apparatus 100 performs communication concerning authentication to execute an application with the authentication server 200. More specifically, the information processing apparatus 100 transmits a safety information acquisition request to the authentication server 200. By transmitting the safety information acquisition request, the information processing apparatus 100 can acquire safety information from the authentication server 200. The information processing apparatus 100 transmits a safety information acquisition request containing, for example, information of an ID to identify the acquired application or information of a URI indicating the acquisition source of the application to the authentication server 200, but the safety information acquisition request transmitted by the information processing apparatus 100 is not limited to the above example.

If, for example, authentication server information recording information to identify an authentication server is stored in the storage unit (described later), the information processing apparatus 100 performs communication with the authentication server 200 based on the authentication server information stored in the storage unit (described later). The authentication server information according to an embodiment of the present invention includes, for example, a URI or IP address representing the authentication server 200.

If authentication server information is not stored, for example, in the storage unit (described later), the information processing apparatus 100 performs communication with the external server 300 (external storage apparatus) recorded in registered external storage apparatus information to acquire authentication server information from the external server 300. Then, the information processing apparatus 100 performs communication with the authentication server 200 based on the authentication server information acquired from the external server 300 recorded in the registered external storage apparatus information.

The registered external storage apparatus information is stored in advance, for example, during manufacture of the information processing apparatus 100. The external server 300 registered in the registered external storage apparatus information is the external server 300 that stores applications whose safety has been verified by the manufacturer of the information processing apparatus 100 or the like. Thus, causing a server-side storage unit (not shown) of the external server 300 registered in the registered external storage apparatus information to store authentication server information can more easily be realized than causing the external server 300 not registered in the registered external storage apparatus information to store the authentication server information. This is because the external server 300 registered in the registered external storage apparatus information is more likely to be managed by, for example, the manufacturer of the information processing apparatus 100 or a person related to the manufacturer.

Thus, even if the information processing apparatus 100 does not store authentication server information in the storage unit (not shown) thereof, the information processing apparatus 100 can perform communication with the authentication server 200 by acquiring the authentication server information from the external server 300 recorded in the registered external storage apparatus information.

(4-2) Second Execution Determination Processing

The information processing apparatus 100 determines whether to execute an application based on safety information (authentication result) acquired from the authentication server 200 by the processing of (4-1).

More specifically, if the safety information acquired from the authentication server 200 indicates that execution of an application is not permitted, the information processing apparatus 100 determines that execution of the acquired application is not permitted. Then, the information processing apparatus 100 does not execute an application acquired in the processing (execution processing) of (5) described later based on the determination result in the second execution determination processing.

If the safety information acquired from the authentication server 200 indicates that execution of an application is permitted, the information processing apparatus 100 determines that execution of the acquired application is permitted. Then, the information processing apparatus 100 executes the application acquired in the processing (execution processing) of (5) described later based on the determination result in the second execution determination processing.

(5) Execution Processing

The information processing apparatus 100 selectively executes the acquired application based on the determination result of each piece of processing of the processing (registration determination processing) of (2) to the processing (second execution determination processing) of (4).

More specifically, if it is determined that the external server 300 is registered in the processing (registration determination processing) of (2) or if a determination is made to execute an application in the processing (second execution determination processing) of (4), the information processing apparatus 100 executes the acquired application. Then, when execution of the application completes, the information processing apparatus 100 discards the application. Discarding of the application means, for example, to delete data concerning execution of the application. When an application is discarded, the information processing apparatus 100 may record, for example, information of a history indicating that the application has been executed in a recording medium such as the storage unit (not shown).

If a determination is made not to execute an application in the processing (first execution determination processing) of (3) or the processing (second execution determination processing) of (4), the information processing apparatus 100 does not execute the acquired application. Then, the information processing apparatus 100 discards the acquired application.

The information processing apparatus 100 selectively executes the acquired application based on, for example, as described above, the determination result of each piece of processing of the processing (registration determination processing) of (2) to the processing (second execution determination processing) of (4).

The information processing apparatus 100 executes an application acquired when it is determined in the processing (registration determination processing) of (2) that the external server 300 is registered. If the above determination result is obtained in the processing of (2), the acquired application is highly likely to be an application without safety problem. Therefore, the information processing apparatus 100 can improve safety in execution of an application by executing an application acquired when it is determined that the external server 300 is registered in the processing (registration determination processing) of (2).

The information processing apparatus 100 also executes an application acquired when a determination is made to execute the application in the processing (second execution determination processing) of (4). If the above determination result is obtained in the processing of (4), the acquired application is indicated to be an application whose execution is permitted by the authentication server 200. The authentication server 200 performs authentication concerning an application based on a database functioning as, for example, a black list in which applications whose problem with safety is identified are registered (or as a white list in which applications whose safety is verified are registered).

Thus, an application whose execution is permitted by the authentication server 200 is highly likely an application without safety problem. Therefore, the information processing apparatus 100 can improve safety in execution of an application by executing an application acquired when it is determined that the external server 300 is registered in the processing (second execution determination processing) of (4).

If a determination is made not to execute an application in the processing (first execution determination processing) of (3) or in the processing (second execution determination processing) of (4), the information processing apparatus 100 does not execute the acquired application. If the above determination result is obtained in the processing of (3), the acquired application is, for example, an application whose safety is not verified and also an application whose activation is not desired by the user. If the above determination result is obtained in the processing of (4), the acquired application is, for example, an application whose execution on the authentication server 200 is not permitted. That is, if a determination is made not to execute an application in the processing of (3) or in the processing of (4), the acquired application is highly likely to have a safety problem.

If a determination is made not to execute an application in the processing (first execution determination processing) of (3) or in the processing (second execution determination processing) of (4), the information processing apparatus 100 does not execute the acquired application and thus can improve safety in execution of the application.

Therefore, the information processing apparatus 100 can improve safety in execution of application software executed by being acquired from an external apparatus each time execution of the application software is started by performing the processing (acquisition processing) of (1) to the processing (execution processing) of (5).

(6) Report Processing

By performing the processing (acquisition processing) of (1) to the processing (execution processing) of (5), the information processing apparatus 100 can execute an application stored in the external server 300 (external storage apparatus) more safely. The information processing apparatus 100 can execute an application stored in the external server 300 and whose safety has not been verified more safely. However, when the information processing apparatus 100 executes an application whose safety has not been verified, it is difficult to assert that the possibility of an occurrence of malfunction caused by execution of the application for some reason in the information processing apparatus 100 is zero.

Thus, in addition to the processing (acquisition processing) of (1) to the processing (execution processing) of (5), the information processing apparatus 100 may further have a function to selectively perform processing to cause transmission of report information indicating any problem concerning safety of an executed application to the authentication server 200.

The report information includes, for example, an ID to identify the application and the number to identify each problem that has arisen (for example, the number set by associating with the type of problem). Information of the number to identify the problem that has arisen regarding the report information is stored in, for example, the storage unit (described later) of the information processing apparatus 100 during manufacture of the information processing apparatus 100, but the time when the storage unit (described later) is caused to store information of the number to identify the problem that has arisen is not limited to the above example. For example, the information processing apparatus 100 may acquire information of the number to identify the problem that has arisen from the authentication server 200 to store the information in the storage unit (described later).

If, for example, the user selects an icon indicating an application whose execution has completed, the information processing apparatus 100 determines whether the external server 300 acting as the acquisition source of the selected application is the external server 300 registered in registered external storage apparatus information. Then, if, for example, the external server 300 acting as the acquisition source of the selected application is not registered in the registered external storage apparatus information, the information processing apparatus 100 selectively transmits report information to the authentication server 200 based on, for example, a user's operation. The information processing apparatus 100 can perform communication with the authentication server 200 by using, for example, the same method as that of the processing (communication processing concerning authentication to execute an application) of (4-1).

More specifically, if, for example, the external server 300 acting as the acquisition source of the selected application is not registered in the registered external storage apparatus information, the information processing apparatus 100 displays a report screen enabling transmission of report information by a user's operation on a display screen.

Figure 3:
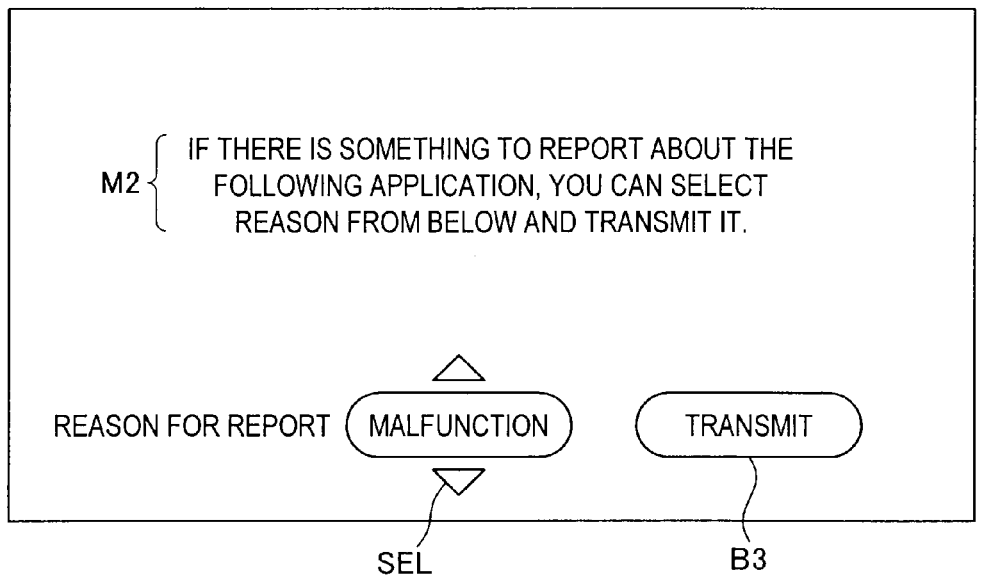
FIG. 3 is an explanatory view illustrating an example of report processing in the information processing apparatus according to an embodiment of the present invention.

FIG. 3 is an explanatory view illustrating an example of report processing in the information processing apparatus 100 according to an embodiment of the present invention. FIG. 3 shows an example of the display screen (report screen) in which a selection image enabling transmission of report information by a user's operation presented to the user in report processing is displayed.

If the external server 300 acting as the acquisition source of the selected application is not registered in the registered external storage apparatus information, the information processing apparatus 100 selectively causes the display screen to display the report screen as shown in FIG. 3, but the report screen made to display by the information processing apparatus 100 is not limited to the above example. If, for example, a malfunction is detected (for example, if an application terminates abnormally) when an application is executed, the information processing apparatus 100 may selectively cause the display screen to display the report screen as shown in FIG. 3 automatically.

As shown in FIG. 3, the information processing apparatus 100 displays an image in which a message M2, a selection means SEL for causing the user to select the type (report content) of problem that has arisen, and a button B3 that triggers the start of transmission of report information are displayed in the display screen. There is a one-to-one correspondence between the type of problem displayed in the selection means SEL and information of the number of the problem that has arisen. It is needless to say that the report screen displayed by the information processing apparatus 100 in report processing according to an embodiment of the present invention is not limited to the example in FIG. 3.

The information processing apparatus 100 selectively performs transmission of report information based on a user's operation (a selection operation of the selection means SEL and a pressing operation of the button B3) on the report screen as shown, for example, in FIG. 3. More specifically, if the user selects, for example, the button B3 shown in FIG. 3, the information processing apparatus 100 transmits report information corresponding to the type of problem selected by the selection means SEL (displayed on the report screen) to the authentication server 200. Though not shown in FIG. 3, the information processing apparatus 100 can also make a transmission (that is, no report information is transmitted) from the report screen to another display screen based on a user's operation.

If the external server 300 acting as the acquisition source of the selected application is registered in the registered external storage apparatus information, the information processing apparatus 100 displays, for example, an inquiry screen.

Figure 4:
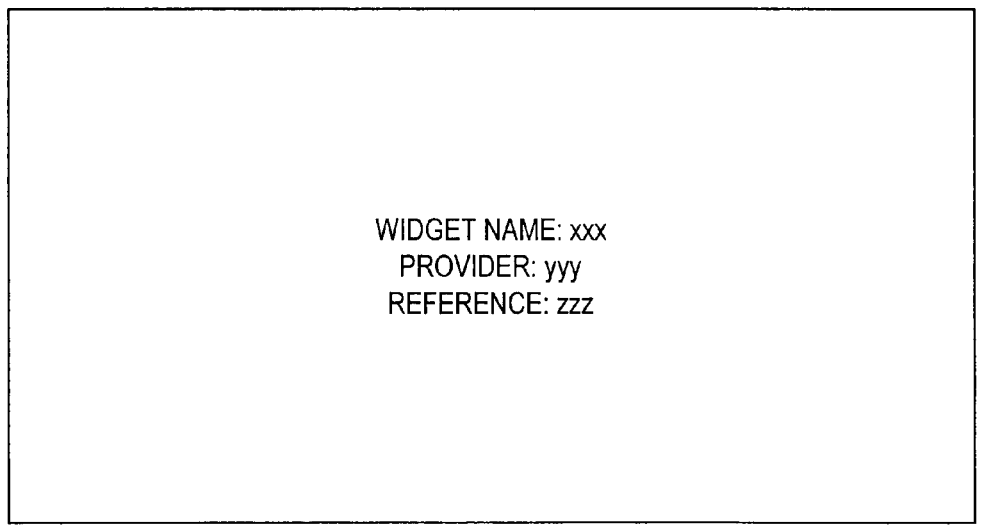
FIG. 4 is an explanatory view illustrating an example of report processing in the information processing apparatus according to an embodiment of the present invention.

FIG. 4 is an explanatory view illustrating an example of report processing in the information processing apparatus 100 according to an embodiment of the present invention. FIG. 4 shows an example of the inquiry screen in which the information processing apparatus 100 plays a role of presenting information of the external server 300 registered in the registered external storage apparatus information to the user in report processing.

Referring to FIG. 4, for example, a widget name (corresponding to the name of an application), a provider name of the application, and reference information are displayed on the inquiry screen. The user can make an inquiry by any method based on various kinds of information displayed on the inquiry screen.

The inquiry screen according to an embodiment of the present invention is not limited to the example in FIG. 4. For example, the information processing apparatus 100 may display the inquiry screen in the same layout as that in FIG. 3 to transmit report information to the corresponding external server 300 based on a user's operation.

The information processing apparatus 100 selectively causes, for example, as described above, transmission of report information to the authentication server 200. Moreover, the information processing apparatus 100 does not transmit, for example, information indicating that there is no safety problem as report information. That is, the authentication server 200 can receive report information indicating applications having a safety problem and the type of problem transmitted from each of the information processing apparatuses 100 constituting the information processing system 1000 and perform an update or the like of the database based on the report information. Thus, for example, the load necessary for verification processing of report information is reduced on the authentication server 200 (and/or an organization operating the authentication server 200). Moreover, more appropriate information can be set (addition, update, deletion and the like) to the database by reducing wasteful verification processing on the authentication server 200 (and/or an organization operating the authentication server 200).

Therefore, the authentication server 200 can improve the precision of an authentication result of an application involved in the processing (second execution determination processing) of (4) in the information processing apparatus 100. Increasing the precision of an authentication result of an application means, for example, to reduce the possibility of an incorrect decision that an unsafe application is determined to be safe.

With the increased precision of an authentication result of an application on the authentication server 200, the information processing apparatus 100 can execute an application acquired from the external server 300 more safely. Therefore, the information processing apparatus 100 can further improve safety in execution of application software executed by being acquired from an external apparatus each time execution of the application software is started by performing the processing (report processing) of (6).

[Concrete Examples of Processing Concerning the Safety Improvement Approach]

Next, processing concerning the safety improvement approach in the information processing apparatus 100 will be described more specifically. [1] the processing (acquisition processing) of (1) to the processing (execution processing) of (5) and [2] the processing (report processing) of (6) will be described separately below.

A widget will be taken below as an example of application selectively executed by the information processing apparatus 100 after being acquired from an external apparatus. However, the application according to an embodiment of the present invention is not limited to the widget. When, for example, any type of software such as a Java applet acquired from an external apparatus for execution appropriately is executed, the information processing apparatus 100 can apply the processing concerning the safety improvement approach according to an embodiment of the present invention.

The acquisition of an application from the external server 300 will be described below as downloading of an application.

[1] FIRST EXAMPLE

Figure 5:
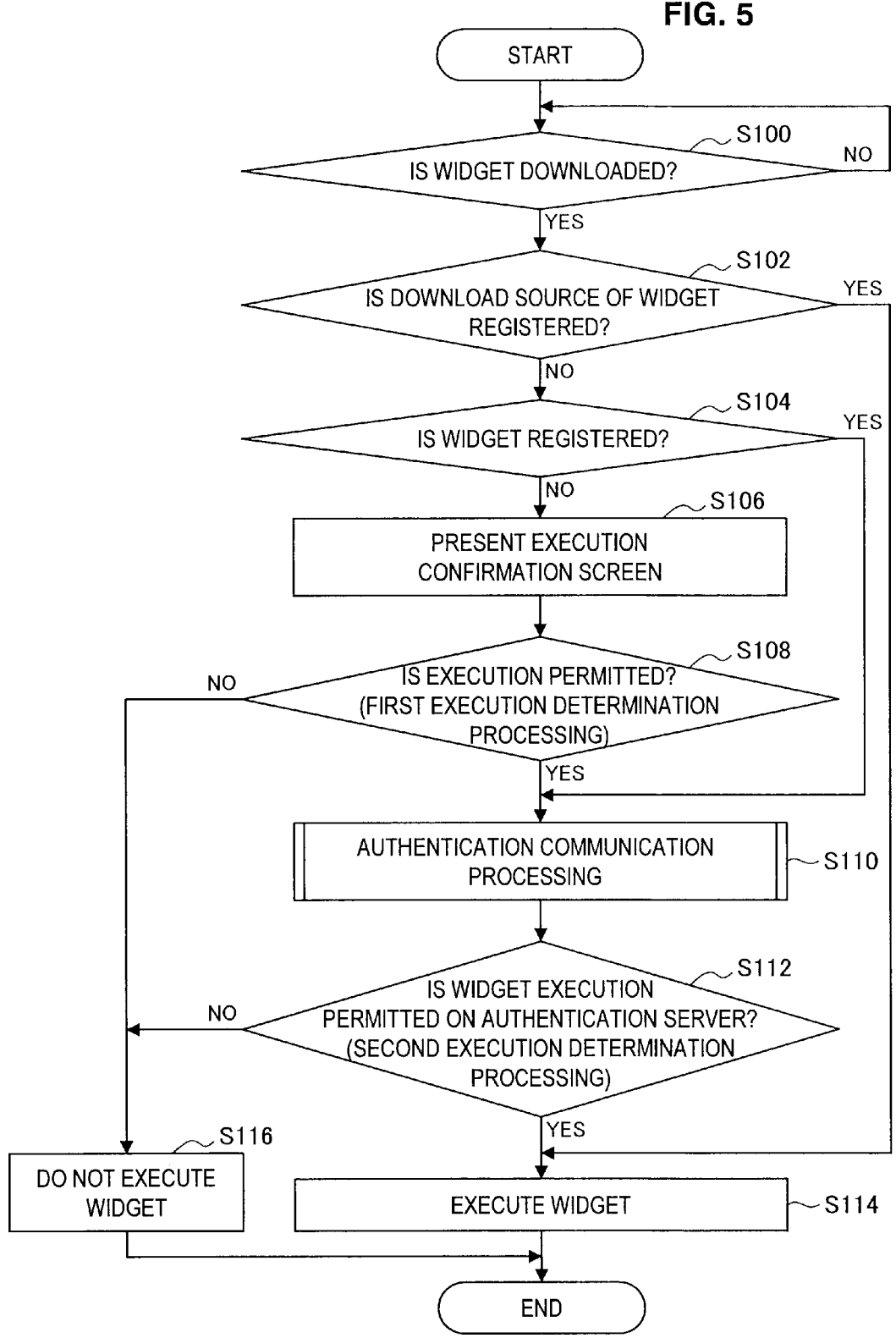
FIG. 5 is a flow chart exemplifying processing concerning a safety improvement approach in the information processing apparatus according to an embodiment of the present invention.

FIG. 5 is a flow chart exemplifying processing concerning the safety improvement approach in the information processing apparatus 100 according to an embodiment of the present invention. FIG. 5 shows an example of the processing (acquisition processing) of (1) to the processing (execution processing) of (5) in the information processing apparatus 100.

The information processing apparatus 100 determines whether a widget has been downloaded (S 100). The information processing apparatus 100 performs processing of step S100 based on, for example, reception of signals by a communication unit (described later) from external apparatuses.

If it is determined in step S100 that no widget has been downloaded, the information processing apparatus 100 does not proceed with processing.

If it is determined in step S100 that a widget has been downloaded, the information processing apparatus 100 determines whether the download source of the widget is registered (S102). The information processing apparatus 100 performs processing of step S102 based on, for example, a result of comparing URI information (an example of registered external storage apparatus information) stored in the storage unit (described later) with URI information contained in the downloaded widget. More specifically, for example, if a URI matching the URI contained in the widget is detected in the stored URI information, the information processing apparatus 100 determines that the download source of the widget is registered. Processing in step S102 corresponds to the processing (registration determination processing) of (2).

If it is determined in step S102 that the download source of the widget is registered, the information processing apparatus 100 executes the downloaded widget (S114). Processing in step S114 corresponds to the processing (execution processing) of (5).

If it is determined in step S102 that the download source of the widget is not registered, the information processing apparatus 100 determines whether the widget is registered (S104). The information processing apparatus 100 performs processing of step S104 based on, for example, a result of comparing ID information (an example of registered application information) of widgets stored in the storage unit (described later) with ID information contained in the downloaded widget. More specifically, for example, if an ID matching the ID contained in the widget is detected in the stored ID information, the information processing apparatus 100 determines that the widget is registered. Processing in step S104 corresponds to the processing (registration determination processing) of (2).

If it is determined in step S104 that the widget is registered, the information processing apparatus 100 performs processing in step S110 described later.

If it is determined in step S104 that the widget is not registered, the information processing apparatus 100 presents an execution confirmation screen (S106). The execution confirmation screen presented in step S104 includes, for example, the display screen shown in FIG. 2.

After the execution confirmation screen being presented in step S106, the information processing apparatus 100 determines whether execution of the widget is permitted based on a user's operation (S108; first execution determination processing). Processing in step S106 and S108 corresponds to the processing (first execution determination processing) of (3).

If it is determined in step S108 that execution of the widget is not permitted, the information processing apparatus 100 does not execute the downloaded widget (S116). Processing in step S116 corresponds to the processing (execution processing) of (5).

If it is determined in step S108 that execution of the widget is permitted, the information processing apparatus 100 performs authentication communication processing (S110).

[Example of Authentication Communication Processing]

Figure 6:
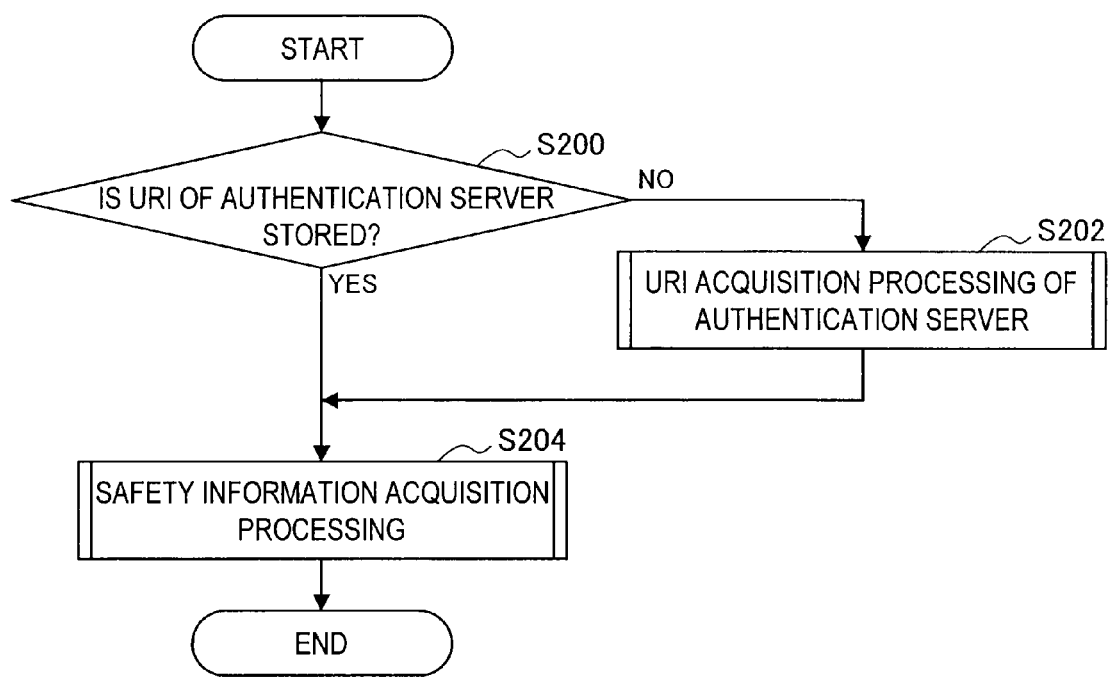
FIG. 6 is a flow chart exemplifying authentication communication processing in the information processing apparatus according to an embodiment of the present invention.

FIG. 6 is a flow chart exemplifying authentication communication processing in the information processing apparatus 100 according to an embodiment of the present invention.

The information processing apparatus 100 determines whether the URI (an example of authentication server information) of the authentication server 200 is stored (S200). The information processing apparatus 100 performs processing in step S200 by referring to, for example, a predetermined storage location such as the storage unit (described later) or an external storage medium.

If it is determined in step S200 that the URI of the authentication server 200 is not stored, the information processing apparatus 100 performs URI acquisition processing of the authentication server (S202).

<Example of URI Acquisition Processing of the Authentication Server>

Figure 7:
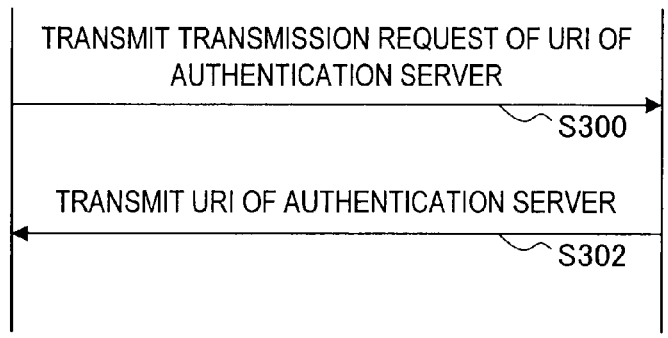
FIG. 7 is an explanatory view exemplifying URI acquisition processing of an authentication server in the information processing apparatus according to an embodiment of the present invention.

FIG. 7 is an explanatory view exemplifying URI acquisition processing of an authentication server in the information processing apparatus 100 according to an embodiment of the present invention.

The information processing apparatus 100 transmits a transmission request of URI requesting transmission of the URI of the authentication server 200 to the external server 300 (for example, the external server 300A in FIG. 1) registered in registered external storage apparatus information (S300).

The external server 300 that has received the transmission request of URI transmitted from the information processing apparatus 100 in step S300 transmits URI information of the authentication server 200 to the information processing apparatus 100 (S302).

The information processing apparatus 100 can acquire the URI of the authentication server 200 from the external server 300 by performing, for example, processing shown in FIG. 7. The URI acquisition processing of an authentication server in the information processing apparatus 100 according to an embodiment of the present invention is not limited to the processing shown in FIG. 7.

By referring to FIG. 6 again, an example of the authentication communication processing in the information processing apparatus 100 according to an embodiment of the present invention will be described. The information processing apparatus 100 performs safety information acquisition processing concerning a downloaded widget based on the stored (or acquired) URI of the authentication server 200 (S204).

<Example of Safety Information Acquisition Processing>

Figure 8:
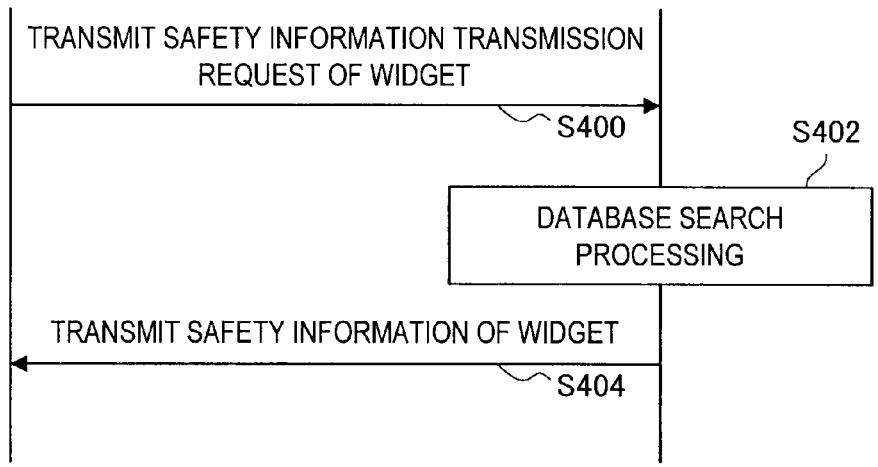
FIG. 8 is an explanatory view exemplifying safety information acquisition processing in the information processing apparatus according to an embodiment of the present invention.

FIG. 8 is an explanatory view exemplifying safety information acquisition processing in the information processing apparatus 100 according to an embodiment of the present invention.

The information processing apparatus 100 transmits a safety information transmission request concerning the downloaded widget to the authentication server 200 (S400).

FIG. 9 is an explanatory view exemplifying the safety information transmission request transmitted by the information processing apparatus 100 according to an embodiment of the present invention. FIG. 9 shows an example of the safety information transmission request conforming to REST (Representational State Transfer) and transmitted by HTTP (Hypertext Transfer Protocol). FIG. 9 shows an example in which the information processing apparatus 100 includes the URI of the download source of a widget in a safety information transmission request as a parameter. It is needless to say that the safety information transmission request transmitted by the information processing apparatus 100 according to an embodiment of the present invention is not limited to the example shown in FIG. 9.

The authentication server 200 that has received the safety information transmission request transmitted by the information processing apparatus 100 in step S400 searches the database based on information (for example, the ID of the widget or the URI of the download source) contained in the safety information transmission request (S402; database search processing). The processing in step S402 on the authentication server 200 corresponds to authentication processing to determine whether the widget is a safe application.

Then, the authentication server 200 transmits safety information based on a result of processing in step S402 to the information processing apparatus 100 (S404).

FIG. 10 is an explanatory view exemplifying safety information transmitted by the authentication server 200 according to an embodiment of the present invention. FIG. 10 shows an example of safety information when the authentication server 200 transmits safety information in XML (Extended Markup Language) format. As shown in FIG. 10, the authentication server 200 transmits, for example, information indicating a normal response to the safety information transmission request (response element shown in FIG. 10) or information whether a widget is executable (widget element shown in FIG. 10) as safety information.

The safety information transmitted by the authentication server 200 according to an embodiment of the present invention is not limited to the example shown in FIG. 10. For example, the format is not limited to the XML format and the authentication server 200 may also transmit safety information in any format (for example, a format in which the recognition system is recorded, for example, during manufacture of the information processing apparatus 100) recognizable by the information processing apparatus 100.

The information processing apparatus 100 can acquire safety information (authentication result) from the authentication server 200 by performing, for example, processing shown in FIG. 8. Incidentally, the safety information acquisition processing in the information processing apparatus 100 according to an embodiment of the present invention is not limited to the processing shown in FIG. 8.

The information processing apparatus 100 can also acquire safety information (authentication result) from the authentication server 200 to realize authentication communication processing with the authentication server 200 by performing, for example, processing shown in FIG. 6. Incidentally, the authentication communication processing in the information processing apparatus 100 according to an embodiment of the present invention is not limited to the processing shown in FIG. 6.

By referring to FIG. 5 again, an example of processing concerning the safety improvement approach in the information processing apparatus 100 according to an embodiment of the present invention will be described. After authentication communication processing with the authentication server 200 being completed in step S110, the information processing apparatus 100 determines whether execution of the widget is permitted by the authentication server 200 (S112). The information processing apparatus 100 makes a determination in step S112 based on safety information (authentication result) as shown, for example, in FIG. 10. More specifically, the information processing apparatus 100 determines that execution of the widget is permitted if, for example, the value of the status attribute contained in the safety information is 0 (zero) and determines that execution of the widget is not permitted if the value is other than 0 (zero).

Processing in steps S110 and S112 corresponds to the processing (second execution determination processing) of (4).

If it is determined in step S112 that execution of the widget is permitted, the information processing apparatus 100 executes the downloaded widget (S114). If it is determined in step S112 that execution of the widget is not permitted, the information processing apparatus 100 does not execute the downloaded widget (S116).

The information processing apparatus 100 realizes the processing (acquisition processing) of (1) to the processing (execution processing) of (5) by performing, for example, the processing shown in FIG. 5. Therefore, the information processing apparatus 100 can improve safety in execution of application software executed by being acquired from an external apparatus each time execution of the application software is started. The processing concerning the safety improvement approach in the information processing apparatus 100 according to an embodiment of the present invention is not limited to the processing shown in FIG. 5.

[2] SECOND EXAMPLE

Figure 11:
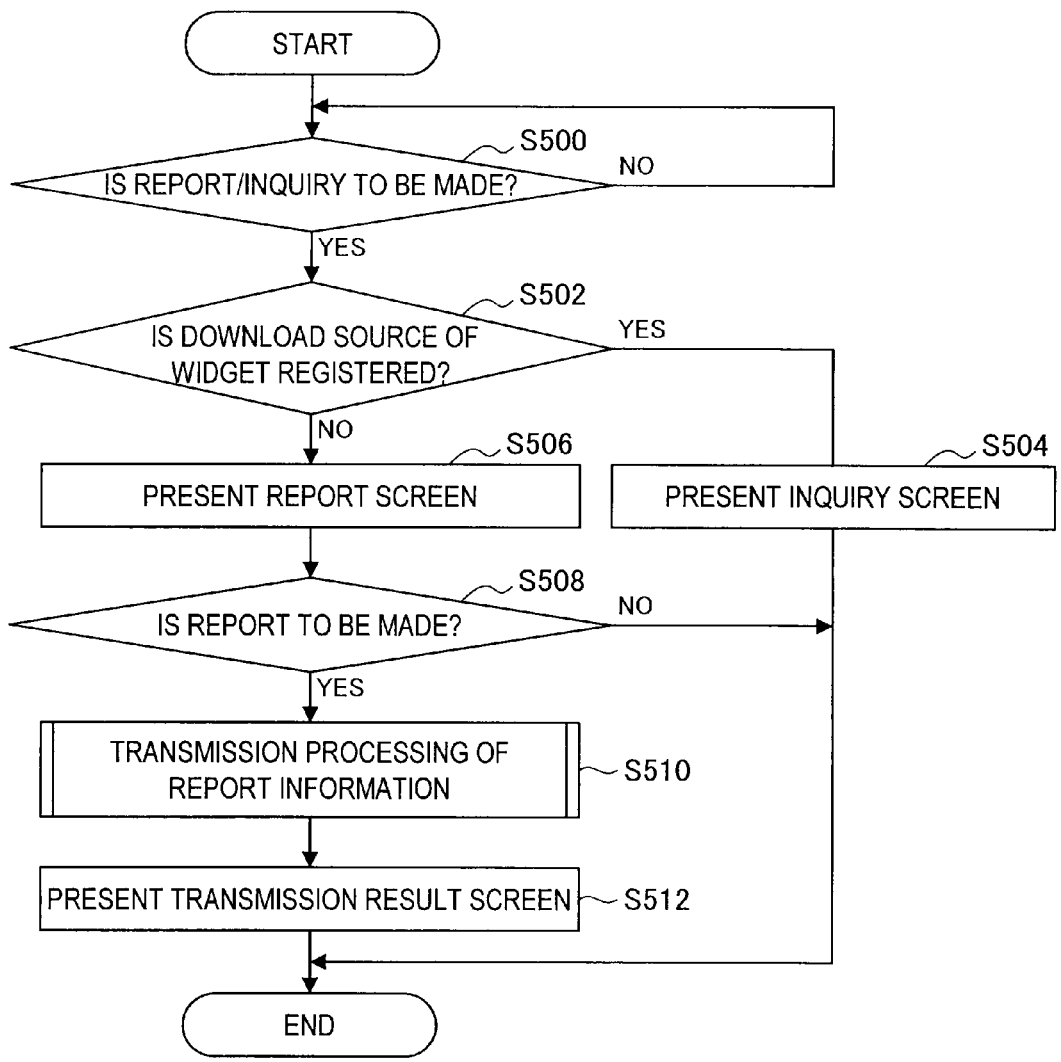
FIG. 11 is a flow chart exemplifying processing concerning the safety improvement approach in the information processing apparatus according to an embodiment of the present invention.

FIG. 11 is a flow chart exemplifying processing concerning the safety improvement approach in the information processing apparatus 100 according to an embodiment of the present invention. FIG. 11 shows an example of processing concerning the processing (report processing) of (6) in the information processing apparatus 100.

The information processing apparatus 100 determines whether to make a report/inquiry (S500). The information processing apparatus 100 performs processing in step S500 based on, for example, an operation signal in accordance with a user's operation transmitted from an operation unit (described later).

If it is determined in step S500 that a report/inquiry is not made, the information processing apparatus 100 does not proceed with processing.

If it is determined in step S500 that a report/inquiry is made, the information processing apparatus 100 determines whether the download source of a widget about which a report/inquiry is made is registered (S502). The information processing apparatus 100 performs processing in step S502 based on, for example, a result of comparing URI information (an example of registered external storage apparatus information) stored in the storage unit (described later) with URI information corresponding to the widget about which a report/inquiry is made.

If it is determined in step S502 that the download source of the widget is registered, the information processing apparatus 100 presents an inquiry screen as shown, for example, in FIG. 4 (S504).

If it is determined in step S502 that the download source of the widget is not registered, the information processing apparatus 100 presents a report screen as shown, for example, in FIG. 3 (S506).

If the report screen is presented in step S506, the information processing apparatus 100 determines whether to make a report (S508). If it is determined in step S508 that no report is made, the information processing apparatus 100 terminates processing.

If it is determined in step S508 that a report is made, the information processing apparatus 100 performs transmission processing of report information (S510).

[Example of Transmission Processing of Report Information]

Figure 12:
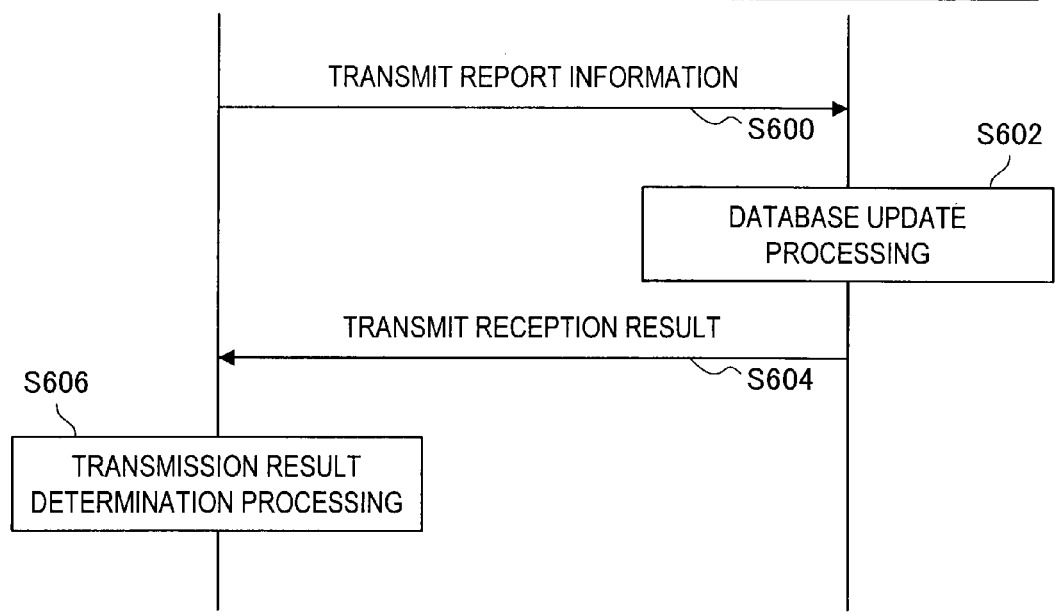
FIG. 12 is an explanatory view exemplifying transmission processing of report information in the information processing apparatus according to an embodiment of the present invention.

FIG. 12 is an explanatory view exemplifying transmission processing of report information in the information processing apparatus 100 according to an embodiment of the present invention.

The information processing apparatus 100 transmits report information based on a user's operation in the report screen shown, for example, in FIG. 3 to the authentication server 200 (S600). The information processing apparatus 100 transmits report information to the authentication server 200 by using the URI of the authentication server 200 stored in, for example, a predetermined storage location such as the storage unit (described later) or an external storage medium, but the transmission method of report information to the authentication server 200 is not limited to the above one. For example, if URI information of the authentication server 200 is not stored in a predetermined storage location, the information processing apparatus 100 performs, like step S202 in FIG. 6, URI acquisition processing of an authentication server. Then, the information processing apparatus 100 transmits report information to the authentication server 200 by using the acquired URI information of the authentication server 200.

FIG. 13 is an explanatory view exemplifying the report information transmitted by the information processing apparatus 100 according to an embodiment of the present invention. FIG. 13 shows an example of the report information conforming to REST and transmitted by HTTP. FIG. 13 also shows the report information in which report content is described in a body part in text format and the URI of the download source of a widget is described as a parameter of HTTP POST. It is needless to say that the report information transmitted by the information processing apparatus 100 according to an embodiment of the present invention is not limited to the example shown in FIG. 13.

The authentication server 200 that have received the report information transmitted from the information processing apparatus 100 in step S600 updates the database based on information contained in the received report information (S602). Updating the database in step S602 indicates, for example, registration of information in the database, deletion of information from the database, or updating of information recorded in the database.

In FIG. 12, an example in which the database is updated each time the authentication server 200 receives report information is shown, but the update method of the database on the authentication server 200 is not limited to the above one. For example, the authentication server 200 may accumulate report information transmitted appropriately from each of the information processing apparatuses 100 constituting the information processing system 1000 for a predetermined period to selectively update the database based on the accumulated report information. The predetermined period is, for example, a few hours, one day, one week, one month or the like. The authentication server 200 adds up the number of pieces of report information, for example, for each widget (an example of application) and each piece of report content, and when an added result exceeds a predetermined threshold, the authentication server 200 selectively updates the database for the concerned widget, but the update method of the widget is not limited to the above one.

The authentication server 200 transmits a reception result of the report information transmitted from the information processing apparatuses 100 in step S600 (S604). The processing in step S604 on the authentication server 200 corresponds to a response to the information processing apparatuses 100 that has transmitted the report information.

FIG. 14 is an explanatory view exemplifying a reception result transmitted by the authentication server 200 according to an embodiment of the present invention. FIG. 14 shows an example of a reception result when the authentication server 200 transmits a reception result in XML format. As shown in FIG. 14, the authentication server 200 transmits, for example, information indicating whether report information has been received normally (response element shown in FIG. 14) or information contained in the received report information (widget element shown in FIG. 14) as a reception result.

The reception result transmitted by the authentication server 200 according to an embodiment of the present invention is not limited to the example shown in FIG. 14. For example, the format is not limited to the XML format and the authentication server 200 may also transmit a reception result in any format (for example, a format in which the recognition system is recorded, for example, during manufacture of the information processing apparatus 100) recognizable by the information processing apparatus 100.

The information processing apparatus 100 that has received the reception result transmitted from the authentication server 200 according to an embodiment of the present invention in step S604 determines a transmission result of the report information based on the reception result (S606). The information processing apparatus 100 determines that the report information has successfully been transmitted if, for example, the value of the err attribute contained in the reception result is 0 (zero) and does not determine that the report information has successfully been transmitted if the value is other than 0 (zero).

The information processing apparatus 100 transmits the report information by performing, for example, the processing shown in FIG. 12, so that the information processing apparatus 100 can grasp the result of the transmission. Incidentally, the transmission processing of report information by the information processing apparatus 100 according to an embodiment of the present invention is not limited to the processing shown in FIG. 12.

In the transmission processing of report information according to an embodiment of the present invention, the information processing apparatus 100 transmits report information in which information is described, as shown in FIG. 13, in text format. The authentication server 200 that has received the report information transmits a reception result in XML format to the information processing apparatus 100 that has transmitted the report information. That is, the data size of each of the report information and reception result is smaller than that of, for example, data indicating an image, audio, or video. Thus, even if each of the information processing apparatuses 100 constituting the information processing system 1000 transmits report information to the authentication server 200 and receives a reception result from the authentication server 200, the possibility of a network failure in the network 500 is very low.

By referring to FIG. 11 again, an example of processing concerning the safety improvement approach in the information processing apparatus 100 according to an embodiment of the present invention will be described. After transmission processing of report information in step S510 being completed, the information processing apparatus 100 presents a transmission result screen based on the reception result received in step S510 (S512).

Figure 15:
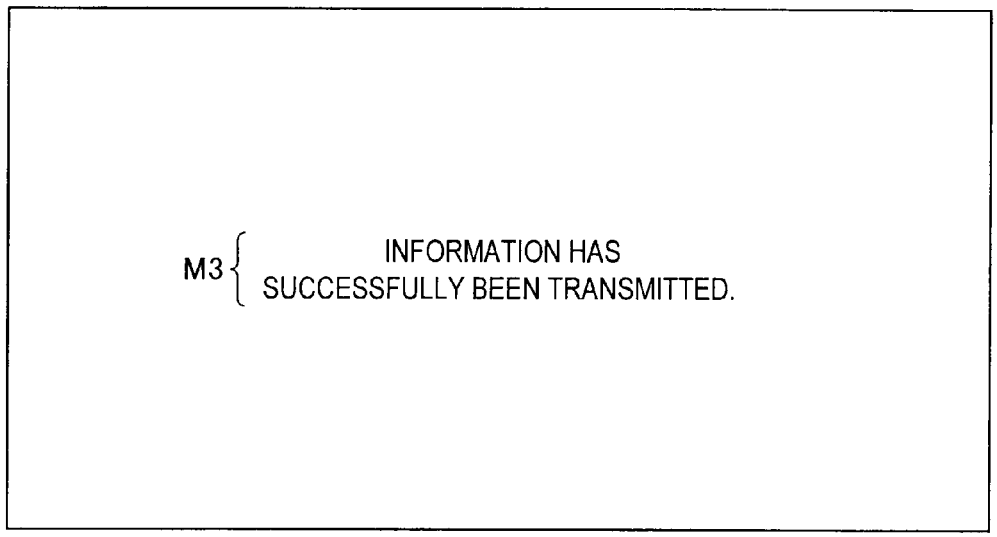
FIG. 15 is an explanatory view exemplifying a transmission result screen presented by the information processing apparatus according to an embodiment of the present invention.
Figure 16:
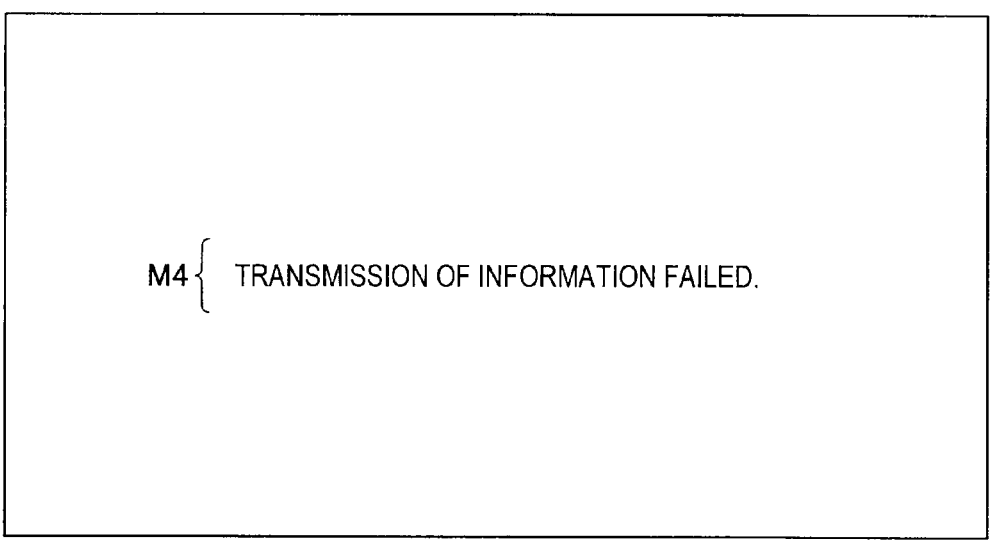
FIG. 16 is an explanatory view exemplifying a transmission result screen presented by the information processing apparatus according to an embodiment of the present invention.

FIGS. 15 and 16 are explanatory views exemplifying the transmission result screen presented by the information processing apparatus 100 according to an embodiment of the present invention. FIG. 15 exemplifies the transmission result screen presented when the information processing apparatus 100 determines that report information has successfully been transmitted in, for example, step S606 shown in FIG. 12. FIG. 16 exemplifies the transmission result screen presented when the information processing apparatus 100 determines that report information has not successfully been transmitted in, for example, step S606 shown in FIG. 12.

The information processing apparatus 100 presents the transmission result screen in which a message in accordance with a determination result, like, for example, a message M3 in FIG. 15 or a message M4 in FIG. 16, in accordance with the determination result based on the reception result in step S606 shown in FIG. 12. It is needless to say that the transmission result screen presented by the information processing apparatus 100 according to an embodiment of the present invention is not limited to the examples shown in FIGS. 15 and 16.

The information processing apparatus 100 realizes the processing (report processing) of (6) by performing, for example, the processing shown in FIG. 11. Therefore, the information processing apparatus 100 can further improve safety in execution of application software executed by being acquired from an external apparatus each time execution of the application software is started.

(Information Processing Apparatus According to an Embodiment of the Present Invention)

Next, a configuration example of the information processing apparatus 100 according to an embodiment of the present invention capable of realizing the above safety improvement approach according to an embodiment of the present invention will be described.

Figure 17:
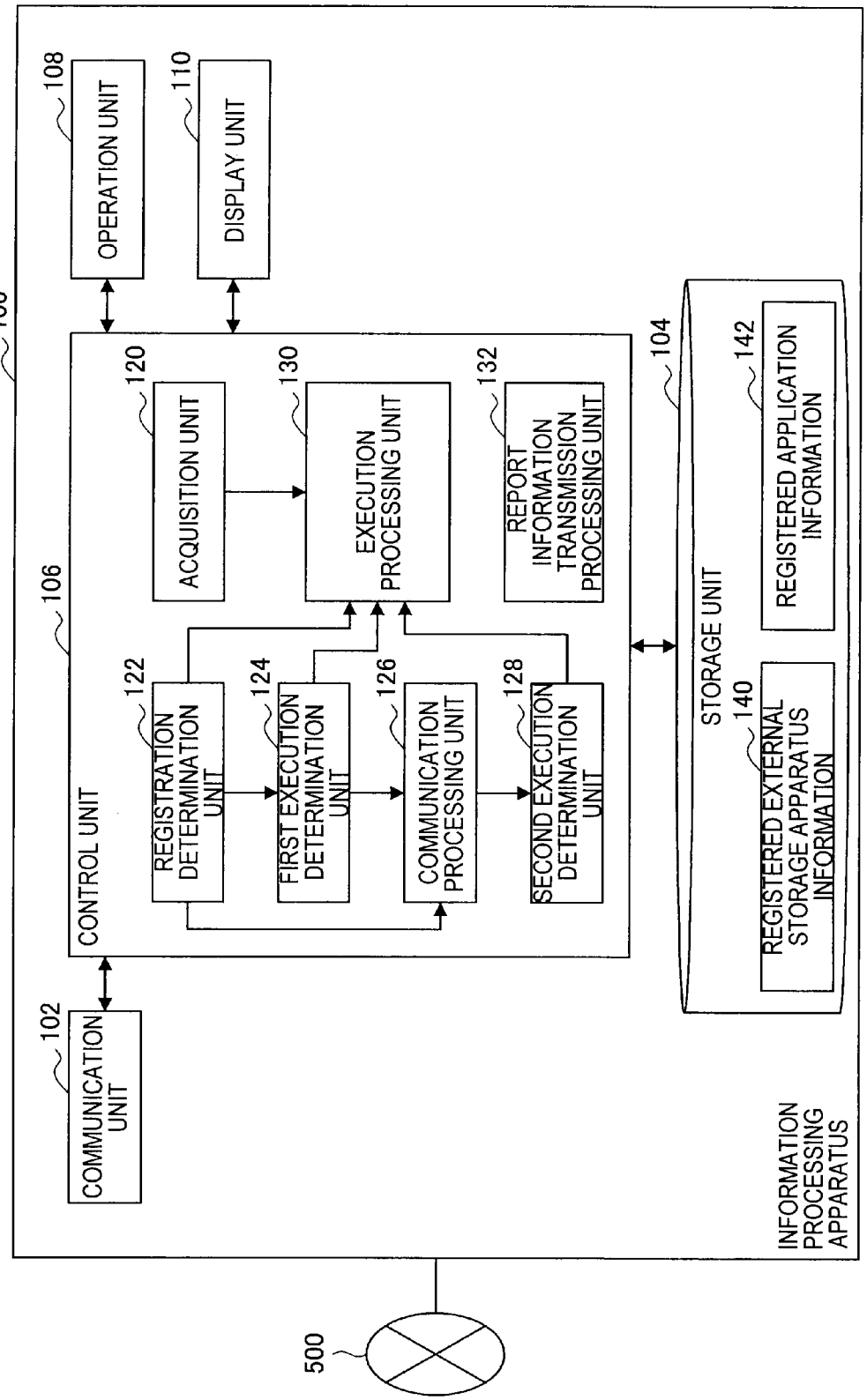
FIG. 17 is an explanatory view exemplifying a configuration of the information processing apparatus according to an embodiment of the present invention.

FIG. 17 is an explanatory view exemplifying the configuration of the information processing apparatus 100 according to an embodiment of the present invention. The information processing apparatus 100 includes a communication unit 102, a storage unit 104, a control unit 106, an operation unit 108, and a display unit 110.

The information processing apparatus 100 may also include, for example, a ROM (Read Only Memory; not shown) or a RAM (Random Access Memory; not shown). The information processing apparatus 100 connects each component by, for example, a bus as a data transmission path.

The ROM (not shown) stores programs and control data such as arithmetic parameters used by the control unit 106. The RAM (not shown) temporarily stores programs executed by the control unit 106.

[Hardware Configuration Example of the Information Processing Apparatus 100]

Figure 18:
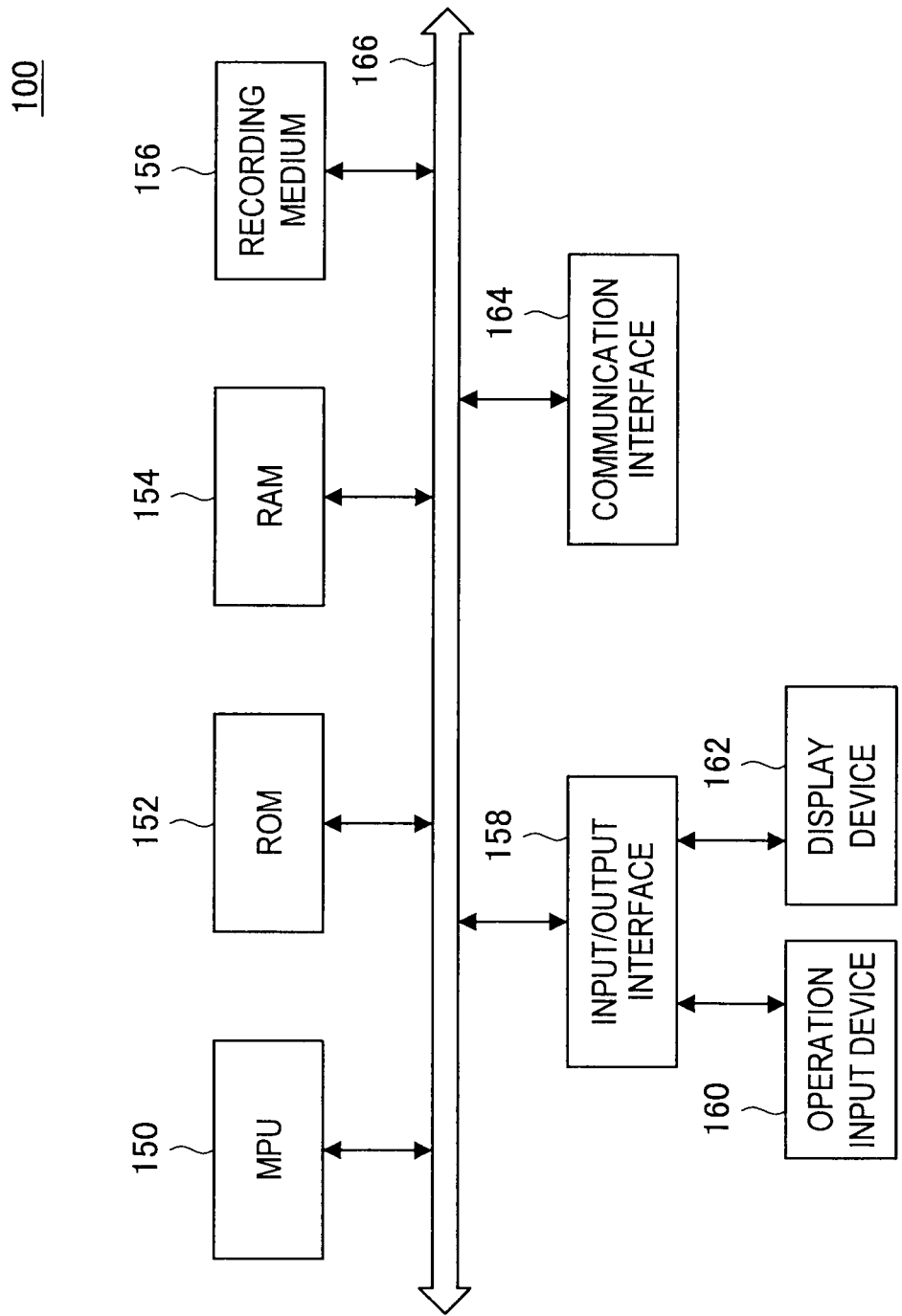
FIG. 18 is an explanatory view exemplifying the hardware configuration of the information processing apparatus according to an embodiment of the present invention.

FIG. 18 is an explanatory view exemplifying the hardware configuration of the information processing apparatus 100 according to an embodiment of the present invention. Referring to FIG. 18, the information processing apparatus 100 includes, for example, an MPU 150, a ROM 152, a RAM 154, a recording medium 156, an input/output interface 158, an operation input device 160, a display device 162, and a communication interface 164. The information processing apparatus 100 connects each component by, for example, a bus 166 as a data transmission path.

The MPU 150 is constituted by an integrated circuit in which a plurality of circuits to realize an MPU (Micro Processing Unit) and a control function is integrated or the like and functions as the control unit 106 that controls the whole information processing apparatus 100. The MPU 150 can also play the role of an acquisition unit 120, a registration determination unit 122, a first execution determination unit 124, a communication processing unit 126, a second execution determination unit 128, an execution processing unit 130, and a report information transmission processing unit 132 described later in the information processing apparatus 100.

The ROM 152 stores programs and control data such as arithmetic parameters used by the MPU 150, and the RAM 154 temporarily stores, for example, programs executed by the MPU 150.

The recording medium 156 functions as the storage unit 104 and stores various kinds of data, for example, registered external storage apparatus information (data), registered application information (data), authentication server information (data), and applications. As the recording medium 156, for example, a magnetic recording medium such as a hard disk and a nonvolatile memory such as an EEPROM (Electrically Erasable and Programmable Read Only Memory), flash memory, MRAM (Magnetoresistive Random Access Memory), FeRAM (Ferroelectric Random Access Memory), and PRAM (Phase change Random Access Memory) can be mentioned.

The input/output interface 158 connects to, for example, the operation input device 160 or the display device 162. The operation input device 160 functions as the operation unit 108, and the display device 162 functions as the display unit 110. As the input/output interface 158, for example, a USB (Universal Serial Bus) terminal, DVI (Digital Visual Interface) terminal, HDMI (High-Definition Multimedia Interface) terminal or various processing circuits can be mentioned. The operation input device 160 is provided, for example, in the information processing apparatus 100 and connected to the input/output interface 158 inside the information processing apparatus 100. As the operation input device 160, for example, a button, an arrow key, a rotary-type selector such as a jog dial, or a combination of these can be mentioned. The display device 162 is provided, for example, in the information processing apparatus 100 and connected to the input/output interface 158 inside the information processing apparatus 100. As the display device 162, for example, an LCD and an organic EL display (organic ElectroLuminescence display and also called an OLED display (Organic Light Emitting Diode display)) can be mentioned. It is needless to say that the input/output interface 158 is connected to an operation input device (for example, a keyboard or mouse) or a display device (for example, an external display) as an external apparatus of the information processing apparatus 100.

The communication interface 164 is a communication means provided in the information processing apparatus 100 and functions as a communication unit (not shown) to perform communication by radio/wire with an external apparatus via the network 500 (or directly). As the communication interface 164, for example, a communication antenna and RF circuit (radio communication), an IEEE802.15.1 port and transmission and reception circuit (radio communication), an IEEE802.11b port and transmission and reception circuit (radio communication), and a LAN terminal and transmission and reception circuit (wire communication) can be mentioned.

The communication interface 164 may also have a function to receive an external operation signal transmitted from an external operation apparatus, for example, a remote controller. In the above case, the communication interface 164 plays the role of an indirect operation unit that delivers an operation signal based on an external operation signal in accordance with a user's operation to the MPU 150 or the like.

With the configuration shown, for example, in FIG. 18, the information processing apparatus 100 performs the processing (acquisition processing) of (1) to the processing (execution processing) of (5) and the processing (report processing) of (6) to realize the above safety improvement approach according to an embodiment of the present invention.

The hardware configuration of the information processing apparatus 100 according to an embodiment of the present invention is not limited to the configuration shown in FIG. 18. For example, the information processing apparatus 100 according to an embodiment of the present invention may further include a slot that removably accommodates an external recording medium.

By referring to FIG. 17 again, components of the information processing apparatus 100 will be described. The communication unit 102 is a communication means provided with the information processing apparatus 100 and performs communication with an external apparatus by radio/wire via the network 500 (or directly). With the communication unit 102 being provided with the information processing apparatus 100, the information processing apparatus 100 can, for example, acquire an application from the external server 300 and also perform communication concerning authentication to execute an application with the authentication server 200.

The communication unit 102 may also have a function to receive an external operation signal transmitted from an external operation apparatus, for example, a remote controller. In the above case, the communication unit 102 plays the role of an indirect operation unit that delivers an operation signal based on an external operation signal in accordance with a user's operation to the control unit 106.

As the communication unit 102, for example, a communications antenna and RF circuit (radio communication) and a LAN terminal and transmission and reception circuit (wire communication) can be mentioned.

The storage unit 104 is a storage means provided with the information processing apparatus 100. As the storage unit 104, for example, a magnetic recording medium such as a hard disk and a nonvolatile memory such as a flash memory can be mentioned.

The storage unit 104 stores various kinds of data, for example, registered external storage apparatus information (data), registered application information (data), authentication server information (data), and applications. FIG. 17 shows an example in which registered external storage apparatus information 140 and registered application information 142 are stored in the storage unit 104.

The control unit 106 is constituted by an MPU or an integrated circuit in which various processing circuits are integrated and plays the role of controlling the whole information processing apparatus 100. The control unit 106 includes the acquisition unit 120, the registration determination unit 122, the first execution determination unit 124, the communication processing unit 126, the second execution determination unit 128, the execution processing unit 130, and the report information transmission processing unit 132. With the above configuration, the control unit 106 plays the role of taking the lead in performing the processing (acquisition processing) of (1) to the processing (execution processing) of (5) and the processing (report processing) of (6).

The acquisition unit 120 plays the role of performing the processing (acquisition processing) of (1). More specifically, the acquisition unit 120 acquires an application from the external server 300 storing applications based on, for example, a user's operation or an acquisition request from other software such as an OS (Operating System) each time processing concerning application execution is started.

The registration determination unit 122 plays the role of performing the processing (registration determination processing) of (2). More specifically, the registration determination unit 122 determines whether the external server 300 that is the acquisition source of the application acquired by the acquisition unit 120 is a pre-registered external server (external storage apparatus).

If, for example, it is determined that the external server is not a pre-registered external server, the registration determination unit 122 may determine whether the application acquired by the acquisition unit 120 is a registered application.

The registration determination unit 122 delivers a determination result to the first execution determination unit 124, the communication processing unit 126, and the execution processing unit 130. The registration determination unit 122 can deliver a determination result to each unit each time a determination is made, but the delivery method of a determination result by the registration determination unit 122 is not limited to the above one. For example, the registration determination unit 122 may deliver a determination result by selecting a delivery destination in accordance with the determination result.

The first execution determination unit 124 plays the role of performing the processing (first execution determination processing) of (3). More specifically, if it is determined by the registration determination unit 122 that the external storage apparatus acting as the acquisition source is not registered, the first execution determination unit 124 determines whether to execute the application acquired by the acquisition unit 120 based on a user's operation. Further, when a determination concerning registration of an application is made by the registration determination unit 122, the first execution determination unit 124 may make a determination based on a user's operation if it is determined that the application is not registered.

The first execution determination unit 124 delivers the determination result to the communication processing unit 126 and the execution processing unit 130. The first execution determination unit 124 can deliver a determination result to each unit each time a determination is made, but the delivery method of a determination result by the first execution determination unit 124 is not limited to the above one. For example, the first execution determination unit 124 may deliver a determination result by selecting a delivery destination in accordance with the determination result.

The communication processing unit 126 plays the role of performing the processing (communication processing concerning authentication to execute an application) of (4-1) of the processing (second execution determination processing) of (4). More specifically, if it is determined by the registration determination unit 122 that the application is registered or a determination to execute the application is made by the first execution determination unit 124, the communication processing unit 126 performs communication concerning authentication to execute the application with the authentication server 200.

The communication processing unit 126 also delivers safety information (authentication result transmitted from the authentication server 200) acquired as a result of processing from the authentication server 200 via the communication unit 102 to the second execution determination unit 128.

The second execution determination unit 128 plays the role of performing the processing (second execution determination processing) of (4-2) of the processing (second execution determination processing) of (4). More specifically, the second execution determination unit 128 determines whether to execute the application acquired by the acquisition unit 120 based on the safety information (authentication result transmitted from the authentication server 200) delivered from the communication processing unit 126.

The second execution determination unit 128 also delivers the determination result to the execution processing unit 130.

The execution processing unit 130 plays the role of performing the processing (execution processing) of (5). More specifically, if it is determined by the registration determination unit 122 that the external server 300 is registered or a determination to execute an application is made by the second execution determination unit 128, the execution processing unit 130 selectively executes the application acquired by the acquisition unit 120. If a determination not to execute the application is made by the first execution determination unit 124 or the second execution determination unit 128, the execution processing unit 130 does not execute the application acquired by the acquisition unit 120.

The report information transmission processing unit 132 plays the role of performing the processing (report processing) of (6). More specifically, the report information transmission processing unit 132 causes transmission of report information to the authentication server 200 based on, for example, a user's operation.

The control unit 106 includes the acquisition unit 120, the registration determination unit 122, the first execution determination unit 124, the communication processing unit 126, the second execution determination unit 128, the execution processing unit 130, and the report information transmission processing unit 132, each of which has functions described above. Thus, the control unit 106 can play the role of taking the lead in performing the processing (acquisition processing) of (1) to the processing (execution processing) of (5) and the processing (report processing) of (6).

The operation unit 108 is an operation means provided with the user-operable information processing apparatus 100. With the operation unit 108 being provided, the information processing apparatus 100 can perform user-desired processing, for example, downloading of an application whose execution is desired, permission of selective execution of applications (first execution determination processing) and selective transmission of report information. As the operation unit 108, for example, a button, an arrow key, a rotary-type selector such as a jog dial, or a combination of these can be mentioned.

The display unit 110 is a display means provided with the information processing apparatus 100 and displays various kinds of information on a display screen. The screen displayed on the display screen of the display unit 110 includes, for example, the execution confirmation screen as shown in FIG. 2, the report screen as shown in FIG. 3, and an operation screen to cause the information processing apparatus 100 to perform a desired operation. As the display unit 110, for example, an LCD and an organic EL display can be mentioned. For example, the information processing apparatus 100 may have the display unit 110 constituted by a touch screen. In the above case, the display unit 110 functions an operation/display unit capable of both user's operations and the display.

The information processing apparatus 100 realizes the processing (acquisition processing) of (1) to the processing (execution processing) of (5) and the processing (report processing) of (6) by the configuration shown, for example, in FIG. 17. Therefore, the information processing apparatus 100 can improve safety in execution of application software executed by being acquired from an external apparatus each time execution of the application software is started.

As described above, the information processing apparatus 100 according to an embodiment of the present invention acquires an application from an external apparatus and selectively executes the acquired application each time execution is started by performing the processing (acquisition processing) of (1) to the processing (execution processing) of (5). The information processing apparatus 100 executes the application acquired when it is determined in the processing (registration determination processing) of (2) that the external server 300 is registered. If the above determination result is obtained in the processing of (2), the acquired application is likely to be an application without safety problem. The information processing apparatus 100 also executes the acquired application if a determination to execute the application is made in the processing (second execution determination processing) of (4). If the above determination result is obtained in the processing of (4), the acquired application is an application whose execution is permitted by the authentication server 200 and thus is likely to be an application without safety problem. If a determination not to execute the application is made in the processing (first execution determination processing) of (3) or the processing (second execution determination processing) of (4), the information processing apparatus 100 does not execute the acquired application. If a determination not to execute the application is made in the processing of (3) or the processing of (4), the acquired application is likely to have a safety problem. The information processing apparatus 100 can selectively execute applications with less problems with safety by selectively executing the acquired application based on a determination result of each piece of processing from the processing (registration determination processing) of (2) to the processing (second execution determination processing) of (4). Therefore, the information processing apparatus 100 can improve safety in execution of application software executed by being acquired from an external apparatus each time execution of the application software is started.

The information processing apparatus 100 selectively transmits report information to the authentication server 200 by performing the processing (report processing) of (6). The authentication server 200 updates the database related to the processing (communication processing concerning authentication to execute an application) of (4-1) based on report information transmitted from each of the information processing apparatuses 100 constituting the information processing system 1000. That is, the authentication server 200 is enabled to improve the precision of application authentication results by report information being transmitted by the information processing apparatuses 100. Moreover, the information processing apparatus 100 is enabled to execute the application acquired from the external server 300 more safely by the precision of application authentication results being improved on the authentication server 200. Therefore, the information processing apparatuses 100 can further improve safety in execution of application software executed by being acquired from an external apparatus each time execution of the application software is started by performing the processing (report processing) of (6).

[Modification of the Information Processing Apparatus According to an Embodiment of the Present Invention]

The configuration of the information processing apparatus according to an embodiment of the present invention is not limited to the configuration shown in FIG. 17. For example, the information processing apparatus according to an embodiment of the present invention may adopt a configuration without the report information transmission processing unit 132 in FIG. 17. Even with the above configuration, the information processing apparatus according to an embodiment of the present invention can still realize the processing (acquisition processing) of (1) to the processing (execution processing) of (5). Therefore, even with the above configuration, the information processing apparatus according to an embodiment of the present invention can improve safety in execution of application software executed by being acquired from an external apparatus each time execution of the application software is started.

In the above description, the information processing apparatus 100 is taken as a component constituting the information processing system 1000 according to an embodiment of the present invention, but the embodiment of the present invention is not limited to such a configuration. The embodiment of the present invention can be applied to various devices, for example, a computer such as a PC and note-type PC, a mobile communication apparatus such as a mobile phone and PHS (Personal Handyphone System), a video/music reproducer, a game machine, a display apparatus such as an LCD and organic EL display, and a TV set capable of receiving digital broadcasting/analog broadcasting.

The authentication server 200 is taken in the above description as a component constituting the information processing system 1000 according to an embodiment of the present invention, but the embodiment of the present invention is not limited to such a configuration. The embodiment of the present invention can be applied to various devices, for example, a computer such as a PC and server.

The external server 300 is taken in the above description as a component constituting the information processing system 1000 according to an embodiment of the present invention, but the embodiment of the present invention is not limited to such a configuration. The embodiment of the present invention can be applied to various devices, for example, a computer such as a PC and server.

(Program According to Information Processing Apparatus of an Embodiment of the Present Invention)

Safety in execution of application software executed by being acquired from an external apparatus each time execution of the application software is started can be improved by a program causing a computer to function as an information processing apparatus according to an embodiment of the present invention.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

In the information processing apparatus 100 shown in FIG. 13, for example, the configuration in which the control unit 106 includes the acquisition unit 120, the registration determination unit 122, the first execution determination unit 124, the communication processing unit 126, the second execution determination unit 128, the execution processing unit 130, and the report information transmission processing unit 132 is shown, but the configuration of the information processing apparatus according to an embodiment of the present invention is not limited to the above one. For example, the information processing apparatus according to an embodiment of the present invention may include each of the acquisition unit 120, the registration determination unit 122, the first execution determination unit 124, the communication processing unit 126, the second execution determination unit 128, the execution processing unit 130, and the report information transmission processing unit 132 shown in FIG. 17 individually (for example, the units are each realized by separate processing circuits).

In the foregoing, a program (computer program) causing a computer to function as an information processing apparatus according to an embodiment of the present invention being provided is shown, but an embodiment of the present invention can further provide a storage medium in which the program is stored together.

The above configuration shows an example of the embodiment of the present invention and belongs naturally to the technical scope of the present invention.

The invention claimed is:

1. An information processing apparatus, comprising:
   communication circuitry that communicates with an external apparatus;
   acquisition circuitry that acquires application software from an external storage apparatus storing the application software via the communication circuitry when a processing concerning execution of the application software is started;
   registration determination circuitry that determines whether the external storage apparatus, which is an acquisition source of the acquired application software, is a pre-registered external storage apparatus based on registered external storage apparatus information that identifies the external storage apparatus acting as the acquisition source contained in the acquired application software, the registration determination circuitry determining whether the external storage apparatus is pre-registered independently of and prior to determining whether the acquired application software is registered;
   first execution determination circuitry that determines whether to execute the acquired application software based on a user's operation after the registration determination circuitry determines that the external storage apparatus acting as the acquisition source is not registered;
   communication processing circuitry that performs communication concerning authentication to execute the application software with an authentication server via the communication circuitry after the first execution determination circuitry determines to execute the application software and after the registration determination circuitry determines that the external storage apparatus acting as the acquisition source is not registered;
   second execution determination circuitry that determines whether to execute the application software based on an authentication result transmitted from the authentication server; and
   execution processing circuitry that selectively executes the acquired application software after the registration determination circuitry determines that the external storage apparatus is registered or the second execution determination circuitry determines to execute the application software, wherein
   the communication processing circuitry performs communication with the authentication server based on authentication server information in which information to identify the authentication server acquired from the external storage apparatus recorded in the registered external storage apparatus information is recorded, and
   the application software is discarded after the application software is executed.

2. The information processing apparatus according to claim 1, wherein:
   after the registration determination circuitry determines that the external storage apparatus acting as the acquisition source is not registered, the registration determination circuitry determines whether the acquired application software is registered application software; and
   after the registration determination unit determines that the application software is registered,
      the first execution determination circuitry does not determine whether to execute the application software, and
      the communication processing circuitry performs communication concerning the authentication with the authentication server.

3. The information processing apparatus according to claim 1, further comprising:
   storage circuitry that stores the registered external storage apparatus information in which the information to identify the external storage apparatus is stored.

4. The information processing apparatus according to claim 3, wherein the communication processing circuitry:
   performs communication with the external storage apparatus recorded in the registered external storage apparatus information via the communication circuitry based on the registered external storage apparatus information stored in the storage circuitry.

5. The information processing apparatus according to claim 3, wherein when the authentication server information is stored in the storage circuitry, the communication processing circuitry performs communication with the authentication server based on the authentication server information stored in the storage circuitry.

6. The information processing apparatus according to claim 2, further comprising:
   storage circuitry that stores registered application information indicating registered application software, wherein
   the registration determination circuitry determines whether the acquired application software is registered based on the registered application information stored in the storage circuitry.

7. The information processing apparatus according to claim 1, wherein when neither the first execution determination circuitry nor the second execution determination circuitry determines to execute the application software, the execution processing circuitry does not execute the acquired application software.

8. The information processing apparatus according to claim 1, further comprising:
   report information transmission processing circuitry that performs processing to cause transmission of report information indicating a problem concerning safety of the executed application software to the authentication server.

9. An execution control method, comprising:
   acquiring application software from an external storage apparatus storing the application software each time processing concerning execution of the application software is started;
   determining whether the external storage apparatus, which is an acquisition source of the acquired application software acquired in the acquisition step, is a pre-registered external storage apparatus based on registered external storage apparatus information that identifies the external storage apparatus acting as the acquisition source contained in the acquired application software, the determining whether the external storage apparatus is pre-registered being performed independently of and prior to determining whether the acquired application software is registered;
   determining whether to execute the acquired application software based on a user's operation after it is determined in the registration determination step that the external storage apparatus acting as the acquisition source is not registered;
   performing communication concerning authentication to execute the application software with an authentication server after the determination to execute the application software is made in the first execution determination step and after it is determined in the registration determination step that the external storage apparatus acting as the acquisition source is not registered;

determining whether to execute the application software based on an authentication result transmitted from the authentication server; and executing the acquired application software selectively after the determination is made in the registration determination step that the external storage apparatus is registered or the determination to execute the application software is made in the second execution determination step, wherein the performing communication includes communicating with the authentication server based on authentication server information in which information to identify the authentication server acquired from the external storage apparatus recorded in the registered external storage apparatus information is recorded, and the application software is discarded after the application software is executed.

10. The execution control method according to claim 9, further comprising:

after the external storage apparatus is determined to not be pre-registered, determining whether the acquired application software is registered application software, and after the acquired application software is determined to be registered application software, performing the communication concerning the authentication with the authentication server without determining whether to execute the acquired application software.

* * * * *